US012372905B2

(12) United States Patent
Nishida et al.

(10) Patent No.: US 12,372,905 B2
(45) Date of Patent: Jul. 29, 2025

(54) IMAGE FORMING APPARATUS

(71) Applicant: CANON KABUSHIKI KAISHA, Tokyo (JP)

(72) Inventors: Satoshi Nishida, Kanagawa (JP); Kohei Okayasu, Shizuoka (JP); Takao Kume, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/472,412

(22) Filed: Sep. 22, 2023

(65) Prior Publication Data

US 2024/0111231 A1 Apr. 4, 2024

(30) Foreign Application Priority Data

Sep. 29, 2022 (JP) ................................ 2022-156018

(51) Int. Cl.
*G03G 15/20* (2006.01)

(52) U.S. Cl.
CPC ................................ *G03G 15/2053* (2013.01)

(58) Field of Classification Search
CPC ........... G03G 15/2017; G03G 15/2039; G03G 15/2042; G03G 15/2053; G03G 15/2064
See application file for complete search history.

(56) References Cited

U.S. PATENT DOCUMENTS

2020/0103803 A1* 4/2020 Furuichi ............ G03G 15/2057
2023/0110956 A1* 4/2023 Furuichi ............ G03G 15/2053 399/328

FOREIGN PATENT DOCUMENTS

JP H04-51179 A 2/1992
JP H09-62124 A 3/1997

* cited by examiner

*Primary Examiner* — Thomas S Giampaolo, II
(74) *Attorney, Agent, or Firm* — Venable LLP

(57) ABSTRACT

An image forming apparatus includes: a first and second rotation bodies; a heater disposed in the first rotation body; and a frame body supporting the first and second rotation bodies. A second length is smaller than a first length in a rotational axis direction of the second rotation body, the first length and the second length being a length of a rotation shaft of the second rotation body exposed on a one-end side and an other-end side of the second rotation body, and a second value is larger than a first value, the first value and the second value being a total area of openings disposed in a first region and a second region of the frame body respectively corresponding to the one-end side and the other-end side of the frame body with respect to a center of the frame body.

19 Claims, 15 Drawing Sheets

| | FIXABILITY (DENSITY REDUCTION RATE) | | | SURFACE TEMPERATURE OF PRESSING ROLLER 21 (°C) | | |
|---|---|---|---|---|---|---|
| | IMAGE LEFT END | IMAGE CENTER | IMAGE RIGHT END | CORRESPONDING TO IMAGE LEFT END | CORRESPONDING TO IMAGE CENTER | CORRESPONDING TO IMAGE RIGHT END |
| TEST APPARATUS 1 | 15% | 12% | 15% | 68℃ | 73℃ | 68℃ |
| TEST APPARATUS 2 | 15% | 12% | 21% | 68℃ | 73℃ | 58℃ |
| TEST APPARATUS 3 | 13% | 10% | 18% | 71℃ | 76℃ | 63℃ |

*Fig.9*

IMAGE FORMING APPARATUS

BACKGROUND OF THE INVENTION

Field of the Invention

The present invention relates to an image forming apparatus.

Description of the Related Art

In an image forming apparatus using an electrophotographic process, after a toner image formed on a photosensitive body is transferred onto a recording material, it passes through an image heating device serving as a fixing device, whereby the toner image is fixed on the recording material. As a fixing device, a contact-type heating fixing device in which a fixing nip is formed using a fixing member heated by a heating member and a pressing member, and an unfixed toner image formed on a recording material is pressed and heated to be fixed using the fixing nip is widely used.

In order to improve printing quality by preventing a curl, gloss unevenness, and the like, heat may be uniformly applied to an entire recording material in a fixing device, and a temperature of the fixing device may be uniform. However, in a rotation shaft of a pressing roller, heat is transferred toward an end of the rotation shaft, and thus the temperature of the end of the rotation shaft may be easily lowered. In a case in which a length of a rotation shaft exposed from one-end side of the pressing roller and a length of the rotation shaft exposed from the other-end side are different from each other, there are cases in which a degree of temperature fall is not uniform on the one-end side and the-other-end side. In addition, also in a case in which a driving member such as a driving gear driving a pressing roller or the like is connected to one-end side of a rotation shaft, there are cases in which a degree of temperature fall is not uniform on the one-end side and the other-end side. In such a case, a deviation of temperature occurs in the rotational axis direction of the pressing roller, and there is a likelihood of occurrence of a deviation in fixability.

For this, inhibiting occurrence of a deviation in the temperature of a fixing device on both sides of a conveyance center position having a heating body of a heating member to be asymmetric with respect a conveyance center position of a recording material can be considered. In addition, technologies for inhibiting occurrence of a deviation in the temperature of a fixing device on both sides of a conveyance center position using a configuration (Japanese Patent Application Publication No. H09-62124) in which a plurality of heating bodies that can independently generate heat are aligned in the rotational axis direction and a configuration in which air is partially blown to a part of a fixing device using a cooling fan (Japanese Patent Application Publication No. H04-51179) have been proposed.

There is concern that inhibition of a deviation of the temperature in a fixing device according to a change of the configuration of heating bodies and the like, addition of a cooling fan, and the like may lead to increases in the size and cost of the device.

SUMMARY OF THE INVENTION

The present invention inhibits a deviation of the temperature in a fixing device while inhibiting increases in the size and cost of a device.

The present invention is an image forming apparatus including:

- a first rotation body;
- a heater disposed in an internal space of the first rotation body;
- a second rotation body including a rotation shaft, configured to come in contact with an outer peripheral surface of the first rotation body and to form a nip together with the first rotation body; and
- a frame body supporting the first rotation body and the second rotation body, wherein.
- the image forming apparatus is configured to fix an image formed on a recording material passing through the nip,
- in a rotational axis direction of the second rotation body that is orthogonal to a conveyance direction of the recording material, the rotation shaft is exposed from a one-end side and an other-end side of the second rotation body,
- a length of the rotation shaft exposed on the one-end side is a first length,
- a length of the rotation shaft exposed on the other-end side is a second length smaller than the first length, and
- a total area of openings disposed in a first region of the frame body is a first value, and a total area of openings disposed in a second region of the frame body is a second value larger than the first value, where the first region is a region corresponding to the one-end side of the frame body with respect to a center of the frame body in the rotational axis direction and the second region is a region corresponding to the other-end side of the frame body with respect to the center of the frame body in the rotational axis direction.

The present invention is an image forming apparatus including:

- a first rotation body;
- a heater disposed in an internal space of the first rotation body;
- a second rotation body including a rotation shaft, configured to come in contact with an outer peripheral surface of the first rotation body and to form a nip together with the first rotation body;
- a frame body supporting the first rotation body and the second rotation body, and
- a driving member configured to drive the second rotation body, wherein.
- the image forming apparatus is configured to fix an image formed on a recording material passing through the nip,
- in a rotational axis direction of the second rotation body that is orthogonal to a conveyance direction of the recording material, among a one-end side and an other-end side of the second rotation body, the driving member is disposed in the one-end side of the second rotation body, and
- a total area of openings disposed in a first region of the frame body is a first value, and a total area of openings disposed in a second region of the frame body is a second value larger than the first value, where the first region is a region corresponding to the one-end side of the frame body with respect to a center of the frame body in the rotational axis direction and the second region is a region corresponding to the other-end side of the frame body with respect to the center of the frame body in the rotational axis direction.

The present invention is an image forming apparatus including:

a first rotation body;

a heater disposed in an internal space of the first rotation body;

a second rotation body including a rotation shaft, configured to come in contact with an outer peripheral surface of the first rotation body and to form a nip together with the first rotation body; and a frame body supporting the first rotation body and the second rotation body, wherein.

the image forming apparatus is configured to fix an image formed on a recording material passing through the nip, in a rotational axis direction of the second rotation body that is orthogonal to a conveyance direction of the recording material, the rotation shaft is exposed from a one-end side and an other-end side of the second rotation body, a length of the rotation shaft exposed on the one-end side is a first length, a length of the rotation shaft exposed on the other-end side is a second length smaller than the first length, and no opening is formed in a first region and openings are disposed in a second region, where the first region is a region corresponding to the one-end side of the frame body with respect to a center of the frame body in the rotational axis direction and the second region is a region corresponding to the other-end side of the frame body with respect to the center of the frame body in the rotational axis direction.

According to the present invention, a deviation of the temperature in a fixing device can be inhibited while increases in the size and cost of a device are inhibited.

Further features of the present invention will become apparent from the following description of exemplary embodiments with reference to the attached drawings.

BRIEF DESCRIPTION OF THE DRAWINGS

FIG. 9 is a result of Test 1;

DESCRIPTION OF THE EMBODIMENTS

Hereinafter, embodiments of the present invention will be described with reference to the drawings. However, dimensions, materials, shapes, relative arrangement, and the like of components described in these embodiments need to be appropriately changed in accordance with a configuration of a device to which the present invention is applied and various conditions, and the scope of the present invention is not intended to be limited to the following embodiments.

Embodiment 1

Image Forming Apparatus

Figure 1:
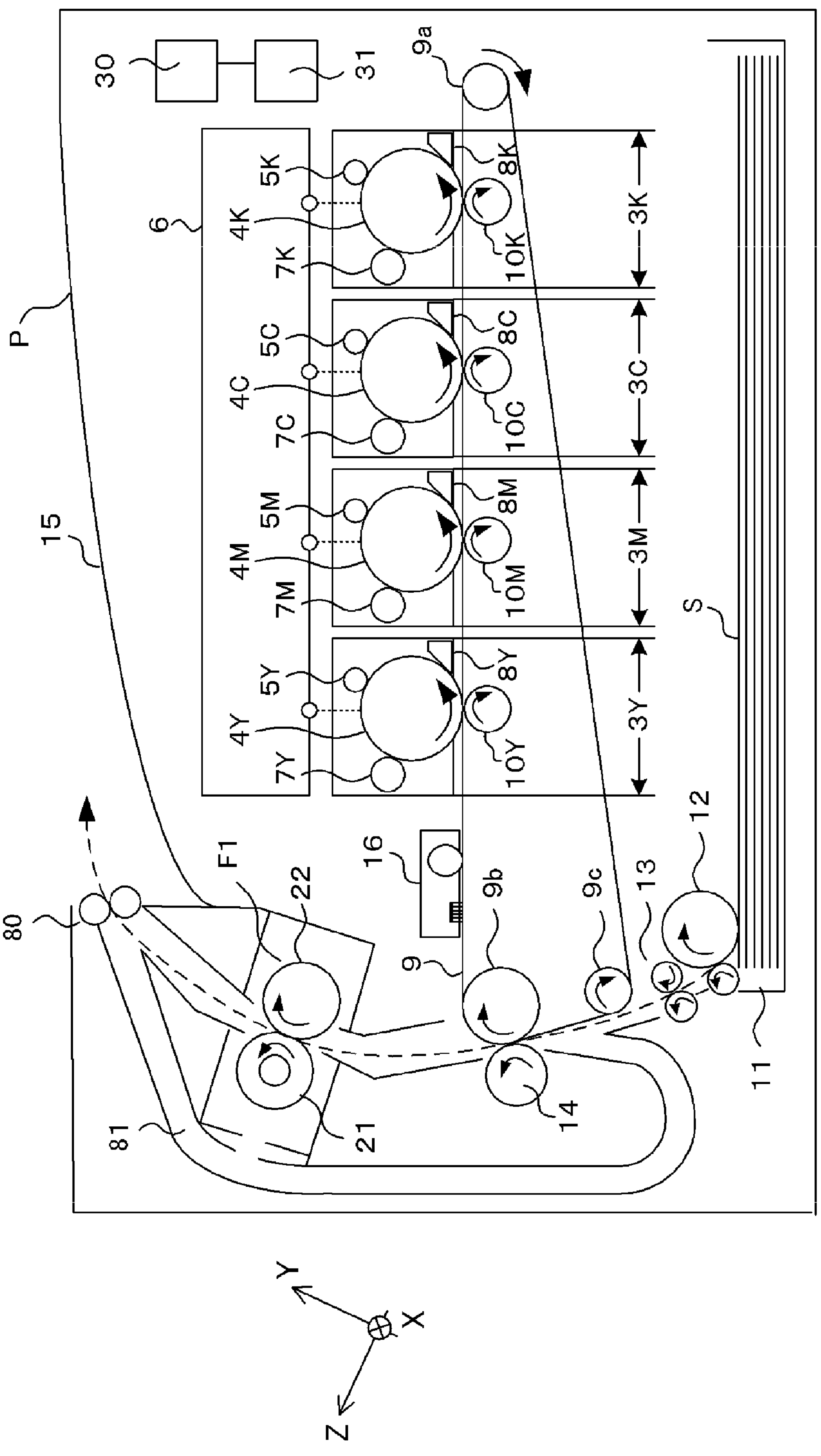
FIG. 1 is a diagram illustrating a schematic configuration of an image forming apparatus according to Embodiment 1.

Hereinafter, an image forming apparatus according to Embodiment 1 of the present invention will be described. FIG. 1 illustrates an image forming apparatus P used in Embodiment 1, and the image forming apparatus includes four image forming stations 3Y, 3M, 3C, and 3K arranged in an approximately linear shape. Among the four image forming stations 3Y, 3M, 3C, and 3K, 3Y is an image forming station forming an image of a yellow (hereinafter, simply denoted as Y) color. 3M is an image forming station forming an image of a magenta (hereinafter, simply denoted as M) color. 3C is an image forming station forming an image of a cyan (hereinafter, simply denoted as C) color. 3K is an image forming station forming an image of a black (hereinafter, simply denoted as K) color.

The image forming stations 3Y, 3M, 3C, and 3K respectively include electrophotographic photosensitive bodies (hereinafter, referred to as photosensitive drums) 4Y, 4M, 4C, and 4K of a drum type as image carriers and charging rollers 5Y, 5M, 5C, and 5K as charging means. In addition, the image forming stations 3Y, 3M, 3C, and 3K respectively include an exposure device 6 as an exposure means, developing devices 7Y, 7M, 7C, and 7K as developing means, and cleaning devices 8Y, 8M, 8C, and 8K as cleaning means.

A video controller 30 performs bit mapping of text codes, a half-toning process through diether of a halftone image or the like, and the like on the basis of information received from an external device (not illustrated) such as a host computer or the like. Then, the video controller transmits a print signal and image information to a control unit (a control unit, a heating control unit) 31. When image information is received, a control unit 31 starts an image forming operation. When image formation is performed, the photosensitive drum 4Y rotates in the direction of an arrow in the image forming station 3Y.

First, an outer peripheral surface (surface) of the photosensitive drum 4Y is uniformly charged by the charging roller 5Y, laser light according to image data is emitted to a charging face of the surface of the photosensitive drum 4Y by the exposure device 6, and the charging face is exposed, whereby an electrostatic latent image is formed. The electrostatic latent image is developed by the developing device 7Y using Y toner, whereby a Y toner image is formed. In accordance with this, the Y toner image is formed on the surface of the photosensitive drum 4Y. Also for the image forming stations 3M, 3C, and 3K, a similar image forming process is performed. In accordance with this, an M toner image is formed on the surface of the photosensitive drum 4M, a C toner image is formed on the surface of the photosensitive drum 4C, and a K toner image is formed on the surface of the photosensitive drum 4K.

An endless intermediate transfer belt 9 disposed in an arrangement direction of the image forming stations 3Y, 3M, 3C, and 3K is stretched over a driving roller 9*a*, a driven roller 9*b*, and a driven roller 9*c*. The driving roller 9*a* rotates clockwise (a direction of an arrow) in FIG. 1. In accordance with this, the intermediate transfer belt 9 rotates and moves at the speed of 100 mm/sec along each of the image forming stations 3Y, 3M, 3C, and 3K.

On an outer peripheral surface (surface) of this intermediate transfer belt 9, toner images of respective colors are sequentially superimposed to be primarily transferred by primary transfer means 10Y, 10M, 10C, and 10K that are disposed to face the photosensitive drums 4Y, 4M, 4C, and 4K with the intermediate transfer belt 9 interposed therebetween. In accordance with this, on the surface of the intermediate transfer belt 9, a full-color toner image of four colors is formed.

After the primary transfer, transfer-remaining toner remaining on the surfaces of the photosensitive drums 4Y, 4M, 4C, and 4K is eliminated by cleaning blades, which are not illustrated, disposed in cleaning devices 8Y, 8M, 8C, and 8K. In accordance with this, the photosensitive drums 4Y, 4M, 4C, and 4K are prepared for next image formation.

Meanwhile, recording materials S that are loaded and housed in a feed cassette 11 disposed below a device main body of the image forming apparatus P are separated and fed from the feed cassette 11 by a feed roller 12 one by one and are fed to a register roller pair 13. The register roller pair 13 sends recording materials S that have been fed to a transfer nip disposed between the intermediate transfer belt 9 and a secondary transfer roller 14.

The secondary transfer roller 14 is disposed to face the driven roller 9*b* with the intermediate transfer belt 9 interposed therebetween. A bias is applied to the secondary transfer roller 14 from a high-voltage power supply not illustrated in the drawing when a recording material S passes through the transfer nip. In accordance with this, a full-color toner image is secondarily transferred to a recording material S passing through the transfer nip from the surface of the intermediate transfer belt 9. Here, the photosensitive drum 4, the intermediate transfer belt 9, the secondary transfer roller 14, and the like described above configure an image forming unit.

Then, the recording material S in which a toner image is carried is conveyed to a fixing device F1. The recording material S is heated and pressed by passing through the fixing device F1, and a toner image thereof is heated and fixed on the recording material S. Then, the recording material S is discharged from the fixing device F1 to a sheet discharge tray 15 outside an image forming apparatus (printer) P. Transfer-remaining toner remaining on the surface of the intermediate transfer belt 9 after the secondary transfer is removed by an intermediate transfer belt cleaning device 16. In accordance with this, the intermediate transfer belt 9 prepares for the next image formation.

Fixing Device

Next, the fixing device F1 fixing a toner image will be described.

Figure 2:
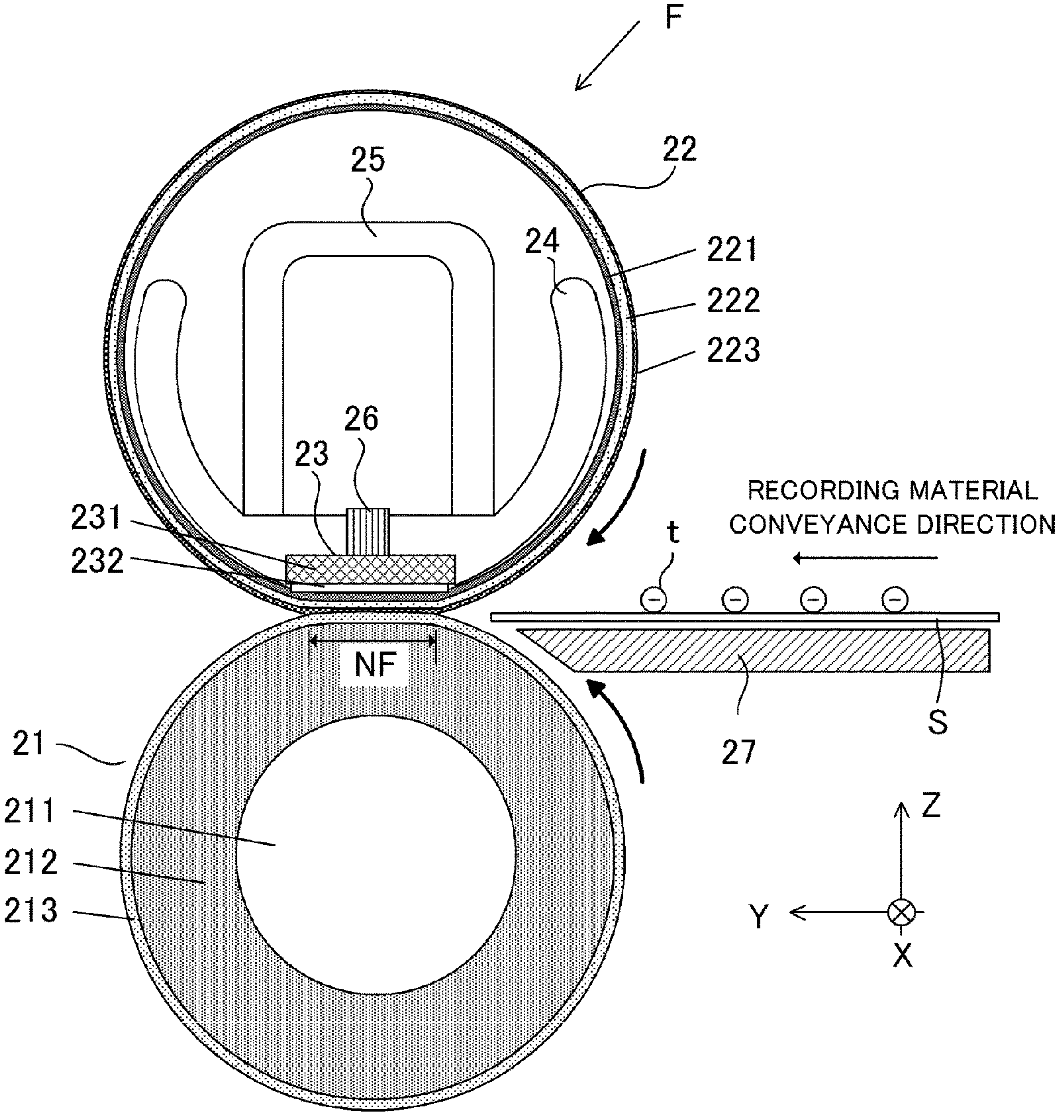
FIG. 2 is a diagram illustrating a cross-section configuration of a fixing device according to Embodiment 1.

FIG. 2 is a diagram illustrating a schematic cross-section view of a cross-section of the fixing device F1 that is perpendicular to an X direction. This fixing device F1 is a device that fixes toner disposed on a recording material onto the recording material by heating and pressing the toner when the recording material S passes through it. The fixing device F1 includes a fixing film 22 that is a first rotation body, a heater 23 disposed in an internal space of the fixing film 22, and a pressing roller 21 that is a second rotation body including a rotation shaft. The fixing device F1 includes a fixing frame 75 (see FIG. 6 and the like) that is a frame body supporting the fixing film 22 and the pressing roller 21. In the fixing device F1, the pressing roller 21 is brought into contact with an outer peripheral surface of the fixing film 22, a nip NF is formed between the pressing roller 21 and the fixing film 22, and a toner image formed on a recording material S passing through the nip NF is fixed. The fixing device F1 is a fixing device of a so-called tension-less type such as so-called a film heating type or a pressing roller driving type. In the following description and drawings, a rotational axis direction of the second rotation body may be referred to as direction X, a conveyance direction of a recording material S in the fixing device F1 may be referred to as direction Y, and a direction perpendicular to the direction X and the direction Y may be referred to as direction Z. In addition, the rotational axis direction may be referred to as a longitudinal direction, and the conveyance direction may be referred to as a transverse direction.

In addition, the fixing device F1 includes a heater holder (a heating member/holding member) 24, a rigidity stay (rigidity member) 25, and the like. The pressing roller 21, the fixing film 22, the heater 23, the heater holder 24, and the rigidity stay 25 are all long members extending in the rotational axis direction of the pressing roller 21 perpendicular to the conveyance direction of the recording material S.

Fixing Film

The fixing film 22 is a film having a cylinder shape that is brought into contact with toner on a recording material. The fixing film 22 is formed in a cylinder shape using a heat-resistance resin member having flexibility. The fixing film 22 includes a base layer 221 having a cylinder shape and an elastic layer 222 and a mold release layer 223 on the outer side thereof.

The base layer 221 is formed using a heat-resistant material having flexibility as its principal component and, for example, is formed using a heat-resistance resin such as polyimide, polyamide-imide, PEEK, PES, or PPS, metal such as SUS or nickel, or the like. The elastic layer 222 is formed from an elastic material having a heat-resistant property such as silicon rubber. The mold release layer 223 is a layer for applying a non-adhesive property for toner and is formed from a fluororesin or the like.

In Embodiment 1, the fixing film 22, for example, includes a base layer 221, which has polyimide as its principal component, of a thickness of 50 μm, an elastic layer 222 formed from silicon rubber having a thickness of 200 μm, and a mold release layer 223 formed from a fluororesin having a thickness of 15 μm. An outer circumferential length of the fixing film 22 is 57 mm, and a length thereof in the rotational axis direction is 223 mm.

An inner circumferential length of the fixing film 22 is larger than an outer circumferential length of the heater holder 24 in which the heater 23 is held. The fixing film 22 is loosely externally fitted to the heater holder 24 in which the heater 23 is held with a margin in the circumferential length. In other words, the fixing film 22 internally includes the heater 23. The fixing film 22 is guided using an outer peripheral surface of the heater holder 24 formed along the inner circumferential shape of the fixing film 22.

The rigidity stay 25 is configured using a rigidity member having a downward (a direction from the fixing film 22 to the pressing roller 21; direction −Z) "U" shape on a cross-section perpendicular to the rotational axis direction (direction X). In FIG. 2, this rigidity stay 25 is disposed at the center in the conveyance direction (the direction Y) of the upper surface of the heater holder 24.

Heater

The heater 23 heats toner disposed on a recording material through the fixing film 22. The heater 23 has a substrate 231 made of a long and narrow ceramic in the rotational axis direction providing a heat-resistance property, an insulating property, and good thermal conductivity. At the center of the surface side (the pressing roller 21 side) of the substrate 231 in the conveyance direction, a resistance heating element 232 is disposed along the rotational axis direction of the substrate 231. The fixing film 22 is interposed between the heater 23 and the pressing roller 21, and an image on a recording material (a toner image) is heated in the nip NF formed between the fixing film 22 and the pressing roller 21 through the fixing film 22.

Figure 3:
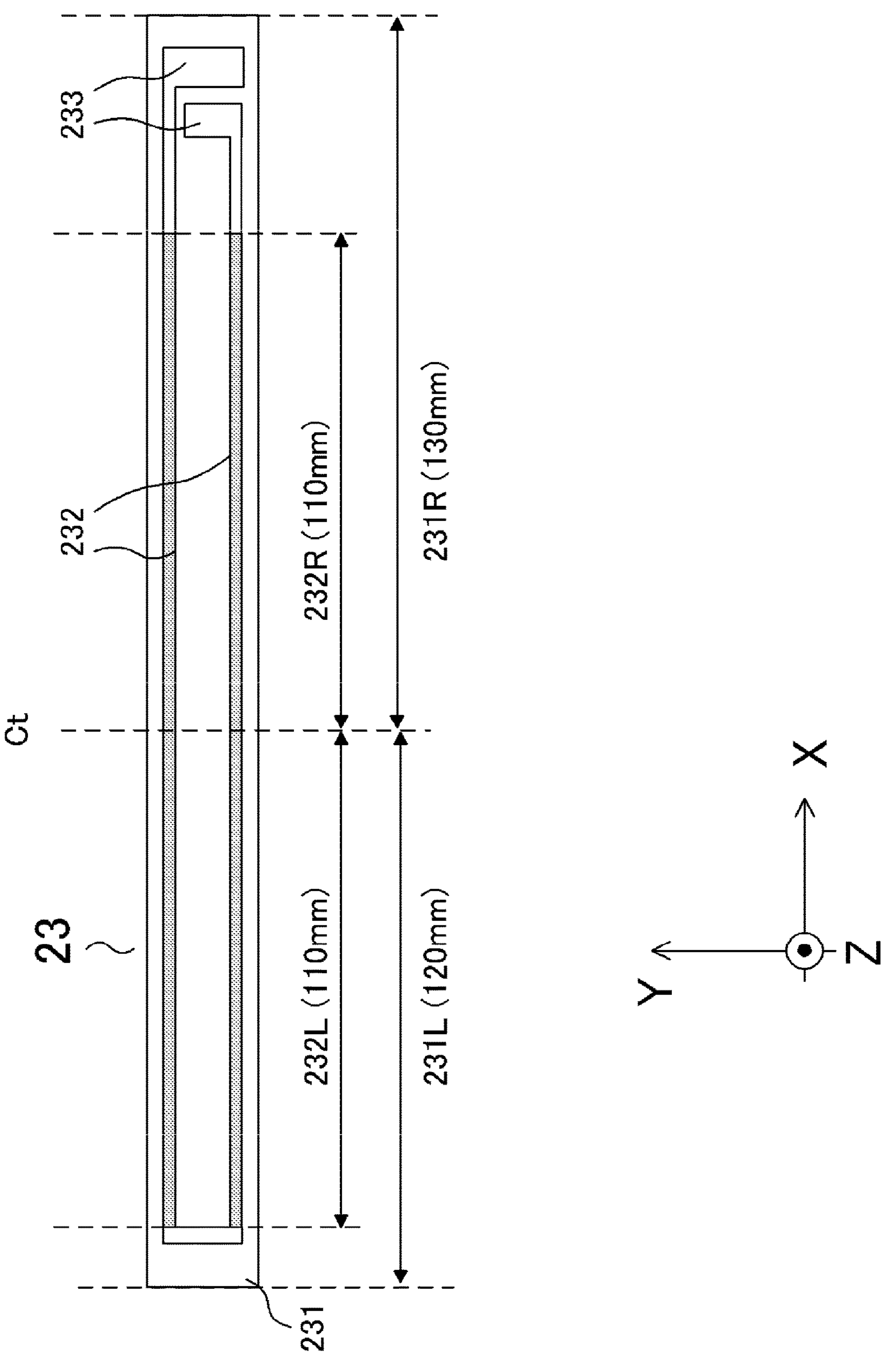
FIG. 3 is a diagram illustrating a schematic configuration of a heater according to Embodiment 1.

FIG. 3 is a schematic diagram illustrating the configuration of the fixing device F1 of the heater 23 according to Embodiment 1 in the rotational axis direction. At the end of the substrate 231 in the rotational axis direction, a power feed electrode 233 for feeding power to the resistance heating element 232 is disposed. On the surface side (the pressing roller 21 side) of the substrate 231, an overcoat layer (not illustrated in FIG. 3) having a heat resistance property is disposed such that it covers the surface of the resistance heating element 232.

A length of the resistance heating element 232 according to Embodiment 1 in the rotational axis direction is 220 mm. The resistance heating element 232 is disposed to be symmetrical with respect to a conveyance center position Ct in the rotational axis direction, and lengths of a part 232L of the direction +X side and a part 232R of the direction −X side with respect to the conveyance center position Ct are equal and are respectively 110 mm in the case of Embodiment 1. A thickness (a dimension in direction Z) of the substrate 231 is 1.0 mm, and a length (a dimension in the direction X) thereof is 250 mm. A length 231R from the conveyance center position Ct to an end of the direction +X side (a side on which the power feed electrode 233 is present) of the substrate 231 in the direction X and a length 231L to an end of the direction −X side in the direction X are not equal, and the length 231R of the direction +X side is larger than the length 231L of the direction −X side. In the case of Embodiment 1, the length 231R of the direction +X side is 130 mm, and the length 231L of the direction −X side is 120 mm.

Pressing Roller

The pressing roller 21 is brought into contact with the fixing film 22. A cross-section configuration of the pressing roller will be described with reference to FIG. 2. In FIG. 2, the pressing roller 21 includes a core 211 having a round shaft shape that is a rotation shaft, an elastic layer 212 formed from silicon rubber formed centrically with the core 211 on the outer circumference of the core 211, and a mold release layer 213 formed using a fluororesin on the periphery of the elastic layer 212. The elastic layer 212 may be formed by foaming heat-resistance rubber such as fluororubber, silicon rubber, or the like. The mold release layer 213 may be a fluororesin having an insulating property. The core 211 is formed from metal such as iron, SUS, or aluminum.

Figure 4:
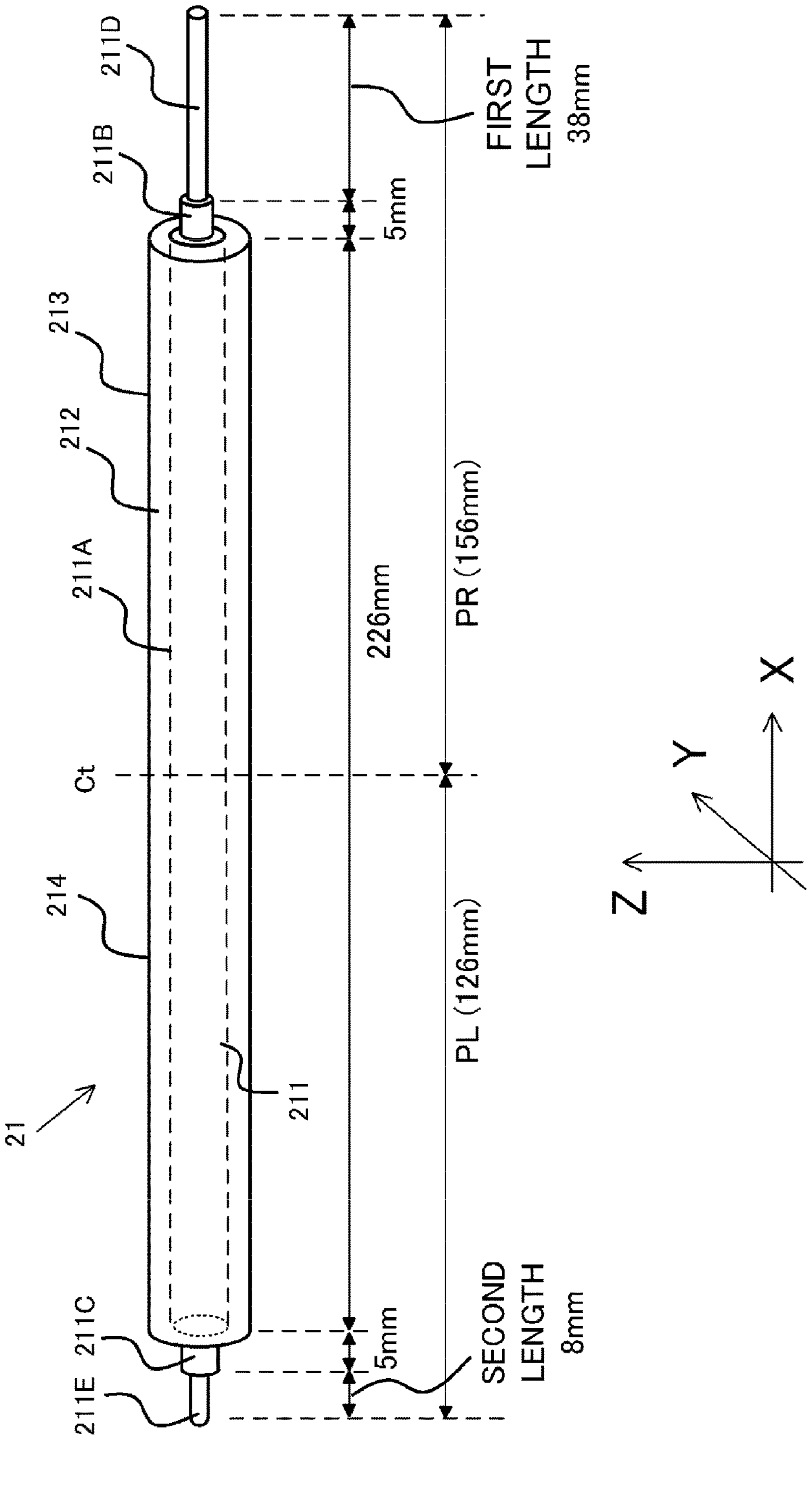
FIG. 4 is a diagram illustrating a schematic configuration of a pressing roller according to Embodiment 1.

FIG. 4 is a schematic diagram illustrating the configuration of the pressing roller 21 in the rotational axis direction. The configuration of the pressing roller 21 and the core 211 in the rotational axis direction will be described with reference to FIG. 4. The pressing roller 21 includes a roller part 214 that is a cylindrical part of which an outer peripheral surface is brought into contact with a recording material. The roller part 214 includes the elastic layer 212 and the mold release layer 213.

The core 211 is a rotation shaft for supporting the roller part 214 to be rotatable and has a multi-stage configuration in which an outer diameter changes in three stages. First, the core 211 includes a roller lower layer part 211A positioned in a lower layer of the roller part 214. The core 211 includes stepped parts 211B and 211C of which diameters are smaller than that of the roller lower layer part 211A at both ends of the roller lower layer part 211A in the rotational axis direction. In the rotational axis direction of the pressing roller 21, the rotation shaft is exposed from the one-end side and the other-end side of the pressing roller 21. The core 211 includes a first shaft 211D in which a pressing roller driving gear 84 (see FIG. 5) that is slidably brought into contact with a bearing 72 (see FIG. 5) is mounted at an end of one side (the direction +X side) of the stepped part 211B. In addition, the core 211 includes a second shaft 211E that is slidably brought into contact with the bearing 72 at an end of the other side (the direction −X side) of the stepped part 211C. In the core 211, the first shaft 211D is present on one-end side with respect to the conveyance center position Ct (a center part of the frame body) with respect to the rotational axis direction, and the second shaft 211E is present on the other-end side.

A first length that is a length of the first shaft 211D in the rotational axis direction is longer than a second length that is a length of the second shaft 211E in the rotational axis direction. At the tip end of one-end side (the direction +X side) of the first shaft 211D, the pressing roller driving gear 84 that is a driving member for driving the pressing roller 21 is mounted.

A length of the roller part 214 of the pressing roller 21 in the rotational axis direction is 226 mm, the elastic layer 212 configuring the roller part 214 is formed by foaming silicon rubber or the like and has a thickness of 4.0 mm, and the mold release layer 213 is a conductive fluororesin and has a thickness of 30 μm. An outer diameter of the pressing roller 21 is 20 mm. The core 211 is formed from iron. In the core 211, the roller lower layer part 211A present in the lower layer of the roller part 214 has an outer diameter of 12 mm and has a length of 226 mm in the rotational axis direction that is the same as that of the roller part 214. The stepped parts 211B and 211C have an outer diameter of 10.0 mm and has a length of 5 mm in the rotational axis direction. The first shaft 211D has an outer diameter of 6.0 mm and a length (first length) of 38 mm in the rotational axis direction, and the second shaft 211E has an outer diameter of 6.0 mm and a length (second length) of 8 mm in the rotational axis direction.

Arrangement of Each Member

Figure 5:
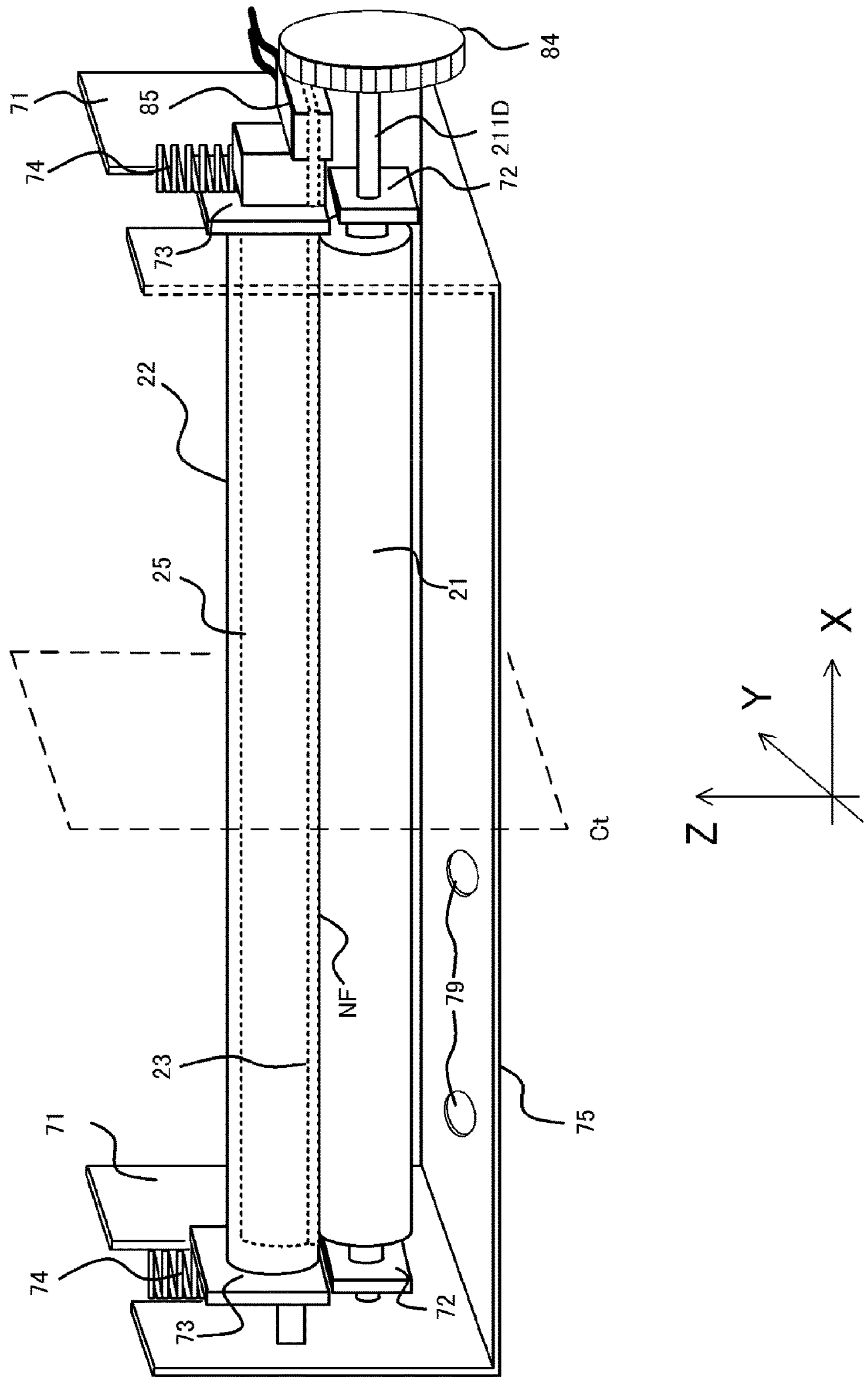
FIG. 5 is a diagram illustrating a schematic configuration of a fixing device according to Embodiment 1 in the rotational axis direction.

FIG. 5 is a schematic diagram illustrating the arrangement of each member of the fixing device F1 and the configuration of an end thereof in the rotational axis direction (the direction X). The pressing roller 21 is disposed under the fixing film 22 in parallel with the fixing film 22, and both ends (the first shaft 211D and the second shaft 211E) of the core 211 of the pressing roller 21 in the rotational axis direction are held to be freely rotated by the bearing 72. An outer peripheral surface (surface) of the pressing roller 21 and an outer peripheral surface (surface) of the fixing film 22 are pressed to be brought into contact with each other, and a nip NF of a predetermined width pinching and conveying a recording material S is formed between the surface of the pressing roller 21 and the surface of the fixing film 22. The bearing 72 of the pressing roller 21 is fixed to a side plate 71 while supporting the pressing roller 21 to be able to rotate.

In both ends of the heater holder 24 (not illustrated in FIG. 5; see FIG. 2) and the rigidity stay 25 in the rotational axis direction, a flange 73 is disposed. The flange 73 regulates a position of the fixing film 22 in the rotational axis direction and is supported to be able to slide in a direction in which the pressing roller 21 is present (the direction Z) along a groove disposed in the side plate 71 of the fixing device F1. The flange 73 receives a welding pressure in accordance with the pressing spring 74 and presses the fixing film 22 to the pressing roller 21 side.

In Embodiment 1, the welding pressure is a total pressure of 20 kgf. The pressing roller 21 is driven by a driving member (not illustrated) other than the fixing device F1 through the pressing roller driving gear 84. In FIG. 5, the conveyance center position Ct is represented using a virtual face that passes a position through which the center of the recording material S passes and is perpendicular to the rotational axis direction.

Fixing Operation

A fixing operation of the fixing device F1 will be described with reference to FIG. 2. In accordance with a print command, by a rotation control unit (driving control means) that is not illustrated in the drawing, the pressing roller 21 is rotated at a predetermined process speed in the direction of an arrow (around the axis X counterclockwise in FIG. 2). The fixing film 22 is driven to rotate around the outer circumference of the heater holder 24 in the direction of an arrow (around the axis X illustrated in FIG. 2 clockwise) while having an inner peripheral surface of the fixing film 22 to slide with being in close contact with the heater 23 in accordance with a frictional force for the surface of the pressing roller 21 in the nip NF.

In addition, the control unit 31 (see FIG. 1) functioning as a conduction control unit (a temperature control unit; a heating control unit) causes a current to flow through the resistance heating element 232 of the heater 23 in accordance with a print command. In accordance with the conduction, the heater 23 rises its temperature and heats the fixing film 22.

The temperature of the heater 23 is detected by a temperature detecting element 26 as a temperature detecting means such as a thermistor disposed on a rear face side (the direction +Z side; a side opposite to a side on which the pressing roller 21 is present) of the substrate 231 of the heater 23. The control unit 31 controls conduction of the resistance heating element 232 such that the heater 23 maintains a predetermined control temperature (a heating temperature controller to be heated) on the basis of an output signal of the temperature detecting element 26. In accordance with this, the nip NF is maintained to the predetermined control temperature.

A recording material S in which an unfixed toner image t is carried is introduced into the nip NF through a fixing entrance guide 27 and is pinched and conveyed between the surface of the pressing roller 21 and the fixing film 22. In the conveyance process, the heat and the pressure of the fixing film 22 are applied to the recording material S, and the unfixed toner image t is heated and fixed on the surface of the recording material S.

Until the recording material S reaches the nip NF or between a fixing operation and another fixing operation, the pressing roller 21 is heated through the fixing film 22 and has a temperature to rise. The heat of the pressing roller 21 can be transferred to the rear face of the recording material S at the time of a heating and fixing operation and contributes to heating and fixing of the unfixed toner image t on the recording material S.

Peripheral Part of Fixing Device F1

Figure 6:
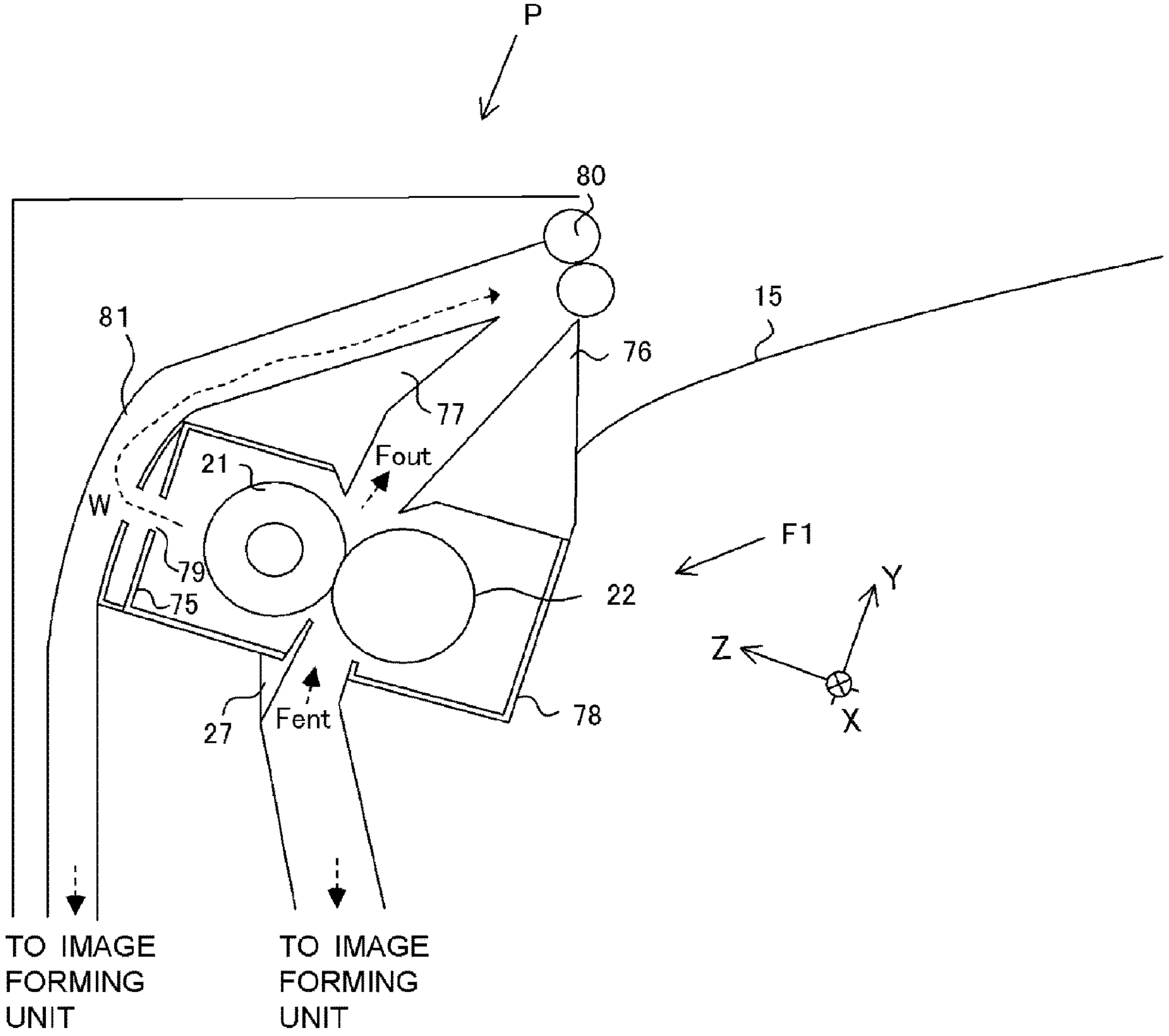
FIG. 6 is a diagram illustrating a cross-section configuration of the periphery of a fixing device according to Embodiment 1.

The peripheral part of the fixing device F1 will be described with reference to FIG. 6. FIG. 6 is a schematic cross-sectional view according to a cross-section perpendicular to the rotational axis direction (the direction X) of the pressing roller 21 for describing the peripheral part of the fixing device F1.

The fixing film 22 and the pressing roller 21 are surrounded by a fixing entrance guide 27 for introducing a recording material S into the fixing device F1, a sheet discharge upper guide 76 and a sheet discharge lower guide 77 guiding a recording material S after a fixing operation, a fixing frame 75, and a fixing upper cover 78. In an upper part of the image forming apparatus P, a sheet discharge tray 15 loading a recording material S after a fixing operation and a sheet discharge roller pair 80 sending out the recording material S to the sheet discharge tray 15 are disposed. The recording material S is carried from a recording material entrance port Fent into the fixing device F1, and the recording material S after the fixing operation is discharged from a recording material discharge port Fout to the sheet discharge tray 15.

The image forming apparatus P according to Embodiment 1 includes a double-side printing mechanism and includes a double-side conveyance path 81 to which a recording material S of which one-side printing has been completed is conveyed at the time of double-side printing. At the time of double-side printing, the recording material S discharged from the recording material discharge port Fout of the fixing device F1 is switched back by the sheet discharge roller pair 80, is introduced into the double-side conveyance path 81, and is resent to the image forming unit (see FIG. 1) through the double-side conveyance path 81.

As a feature of Embodiment 1, in the fixing device F1, an opening 79, which is different from the recording sheet entrance port Fent that is an entrance of the recording material S to pass through the fixing device F1 and the recording material discharge port Fout that is an exit, is disposed. The opening 79 communicates with the double-side conveyance path 81, and the double-side conveyance path 81 communicates with the outside of the image forming apparatus P in the sheet discharge tray 15. A space near the pressing roller 21 surrounded by the pressing roller 21 and members disposed on the periphery of the pressing roller 21 communicates with the outside of the image forming apparatus P through the opening 79 and the double-side conveyance path 81. The double-side conveyance path 81 is connected to the opening 79 and functions as a communication passage causing a space near the pressing roller 21 to communicate with the outside of the image forming apparatus P.

In other words, the opening 79 that communicates from a space surrounded by the pressing roller 21, the fixing entrance guide 27, the sheet discharge lower guide 77, and the fixing frame 75 with the outside of the image forming apparatus P is disposed at a position facing the pressing roller 21 in the fixing frame 75. The opening 79 is connected to the double-side conveyance path 81, and the space described above communicates with the outside of the image forming apparatus P through the double-side conveyance path 81 using a route W.

Figure 7:
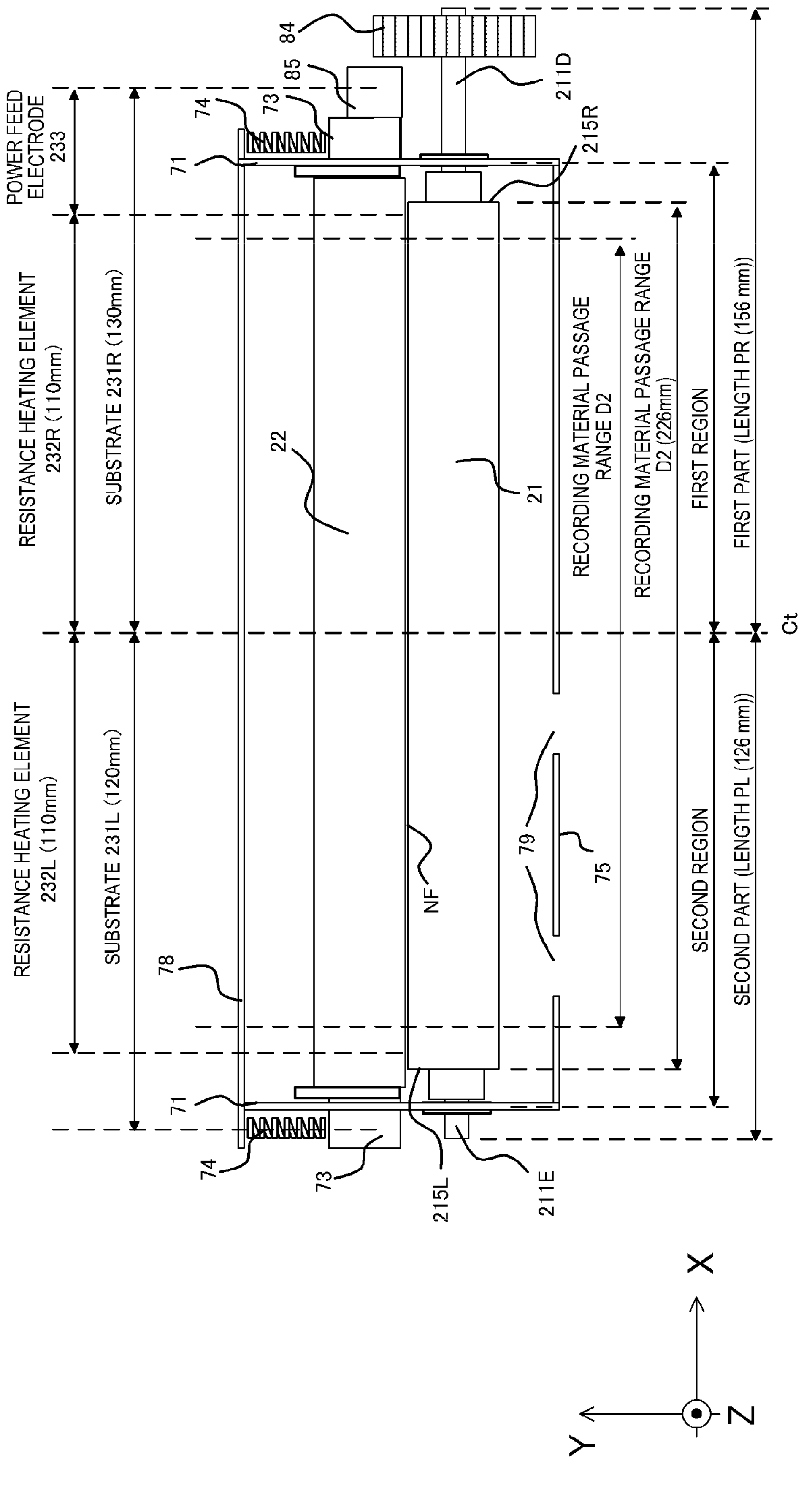
FIG. 7 is a diagram illustrating a positional relation of a fixing device according to Embodiment 1 in the rotational axis direction.

FIG. 7 is a schematic diagram illustrating a positional relation of the opening 79 and each member of the fixing device F1 in the rotational axis direction (the direction X). In Embodiment 1, the shape of the pressing roller 21 is asymmetric with respect to the conveyance center position Ct (the center part of the fixing frame 75) in the rotational axis direction of the fixing device F1. The pressing roller 21 will be described by dividing it into a first part present on the one-end side (the first shaft 211D side; a first length) with respect to the conveyance center position Ct and a second part present on the other-end side (the second shaft 211E side; a second length). Here, the first length of the first shaft 211D is larger than the second length of the second shaft 211E, and thus a length PR of the first part in the rotational axis direction is larger than a length PL of the second part in the rotational axis direction. Thus, a heat capacity of the first part of the pressing roller 21 is larger than a heat capacity of the second part, and the first part has a heat characteristic for more easily radiating heat than the second part. The fixing frame 75 configures a frame body that houses the pressing roller 21.

In Embodiment 1, a form in which the opening 79 is disposed in the fixing frame 75 is asymmetric with respect to the conveyance center position Ct in the rotational axis direction of the fixing device F1. In the fixing frame 75, the opening 79 is disposed at a position near the pressing roller 21 (a face facing the pressing roller 21). In the fixing frame 75, a face in which the opening 79 is formed will be described by dividing it into two regions including a first region corresponding to the one-end side (the first shaft 211D side) with reference to the conveyance center position Ct and a second region corresponding to the other-end side (the second shaft 211E side). Here, no opening is formed in the first region, and the opening 79 is formed in the second region. The number of openings 79 formed in the second region is not particularly limited. In addition, the shape of the opening 79 is not particularly limited and, for example, may be a round hole, a slit, or the like.

As illustrated in FIGS. 5, 6, and 7, in Embodiment 1, in the fixing frame 75 facing the pressing roller 21, at a position of the second shaft 211E side and a position of the center part in the second region, an opening 79, which has an oval shape, of an opening area of 25 $mm^2$ is formed. No opening is formed in the first region. Thus, a total area SL of the opening 79 of the second region is SL=50 $mm^2$. In addition, as illustrated in FIG. 4, a length PR of the first part of the pressing roller 21 is PR=156 mm, and a length PL of the second part is PL=126 mm.

In addition, in Embodiment 1, although the double-side conveyance path 81 also serves as a passage enabling the opening 79 and the outside of the image forming apparatus P to communicate with each other, separately from the double-side conveyance path 81, a passage enabling the opening 79 and the outside of the image forming apparatus P to communicate each other may be separately formed. As a configuration enabling the opening 79 and the outside of the image forming apparatus P to communicate with each other, an arbitrary configuration may be used.

Effects

Effects of Embodiment 1 will be described. In the rotational axis direction of the fixing device F1, a width of the pressing roller 21 is larger than a width of the resistance heating element 232 of the heater 23, and particularly, a width of the core 211 of the pressing roller 21 is larger than a width of the resistance heating element 232 of the heater 23. Heat transferred to the surface of the pressing roller 21 is also transferred to the core 211 inside the pressing roller 21 and is transferred to an end in the rotational axis direction. The temperature of the end of the pressing roller 21 in the rotational axis direction may fall more easily than the temperature of the center part in the rotational axis direction. The pressing roller 21 is not symmetrical with respect to the conveyance center position Ct in the rotational axis direction, the length of the first part of the one-end side is larger than the length of the second part of the other-end side, and thus, it becomes easier for the temperature of the end of the first part to fall further. Since the surface temperature of the pressing roller 21 has an influence on the fixability of the fixing device F1, when there is a deviation in the surface temperature of the pressing roller 21 in the rotational axis direction, a deviation in the fixability of the fixing device F1 occurs in the rotational axis direction, and there is a possibility that a fixing defect or an image defect occurs.

In Embodiment 1, an opening is not provided in the first region corresponding to the first part of the pressing roller 21 in the fixing frame 75, and the opening 79 is formed in the second region corresponding to the second part of the pressing roller 21.

In accordance with this, heat can be radiated from the surface of the pressing roller 21 in a direction for offsetting a deviation in the temperature according to transferred heat inside the pressing roller 21. Thus, occurrence of a temperature difference in the pressing roller 21 in the rotational axis direction due to a difference of lengths of parts of both sides of the conveyance center position Ct of the core 211 of the pressing roller 21 in the rotational axis direction is inhibited, and occurrence of a deviation in the fixability of the fixing device F1 in the rotational axis direction can be inhibited.

A form of heat transfer in the rotational axis direction inside the pressing roller 21 and a form of heat radiation from the opening 79 change in accordance with the temperature of the pressing roller 21. Heat transfer inside the pressing roller 21 may easily increase as the temperature of the pressing roller 21 becomes higher, and a deviation of the temperature in the rotational axis direction that occurs in the core 211 may easily increase as the temperature of the pressing roller 21 becomes higher. In addition, heat radiation from the surface of the pressing roller 21 also increases as the temperature of the pressing roller 21 becomes higher.

Also in a case in which the temperature of the pressing roller 21 is high, a temperature difference of the pressing roller 21 in the rotational axis direction due to a deviation in the temperature in the rotational axis direction occurring in the core 211 is inhibited, and occurrence of fixability of the fixing device F1 in the rotational axis direction can be inhibited. In a case in which the temperature of the pressing roller 21 is low, a deviation in the temperature in the rotational axis direction that occurs in the core 211 is small, and heat radiation from the surface of the pressing roller 21 becomes small as well. Thus, heat radiation from the second part of the pressing roller 21 becomes excessive in accordance with presence of the opening 79, whereby no temperature difference occurs.

According to the image forming apparatus P of Embodiment 1, without disposing an air blowing means forcedly sending air to the fixing device F1 or the like, the temperature of the pressing roller 21 in the rotational axis direction can become uniform as described above. Thus, an increase in the size of the apparatus and the complexity of control can be inhibited. In addition, although an air blowing means sending air to the fixing device F1 through the opening 79 and an air duct may be disposed, as described above, the effects of Embodiment 1 are acquired regardless of presence/absence of the air blowing means.

A deviation of heat transfer inside the pressing roller 21 in the rotational axis direction occurs in accordance with a difference in the shape of the pressing roller 21 in the rotational axis direction. In order to offset a deviation in the heat transfer inside the pressing roller 21 through heat radiation passing through the opening 79, an area of the opening 79 disposed in the second region may be determined in accordance with a difference and a ratio of the lengths of the second part and the first part of the pressing roller 21.

Test 1

Effects of the image forming apparatus P and the fixing device F1 according to Embodiment 1 were checked using the following test. A process speed of the image forming apparatus P used in the test is 100 mm/s, and a gap (an inter-sheet gap) between a preceding recording material S and a next recording material S is 30 mm. The test was performed by installing the image forming apparatus P in an environment of temperature of 23° C. and humidity of 50%. The test starts from a condition of a detection temperature of the temperature detecting element 26 of the heater 23 of the fixing device F1 being 23° C., continuous printing of consecutive 30 sheets is performed, and a 30th print image is evaluated. In the test, a general LBP print sheet, a basis weight of 80 $g/m^2$, an LTR (width 216 mm×vertical 279 mm) size sheet was used.

Figure 8:
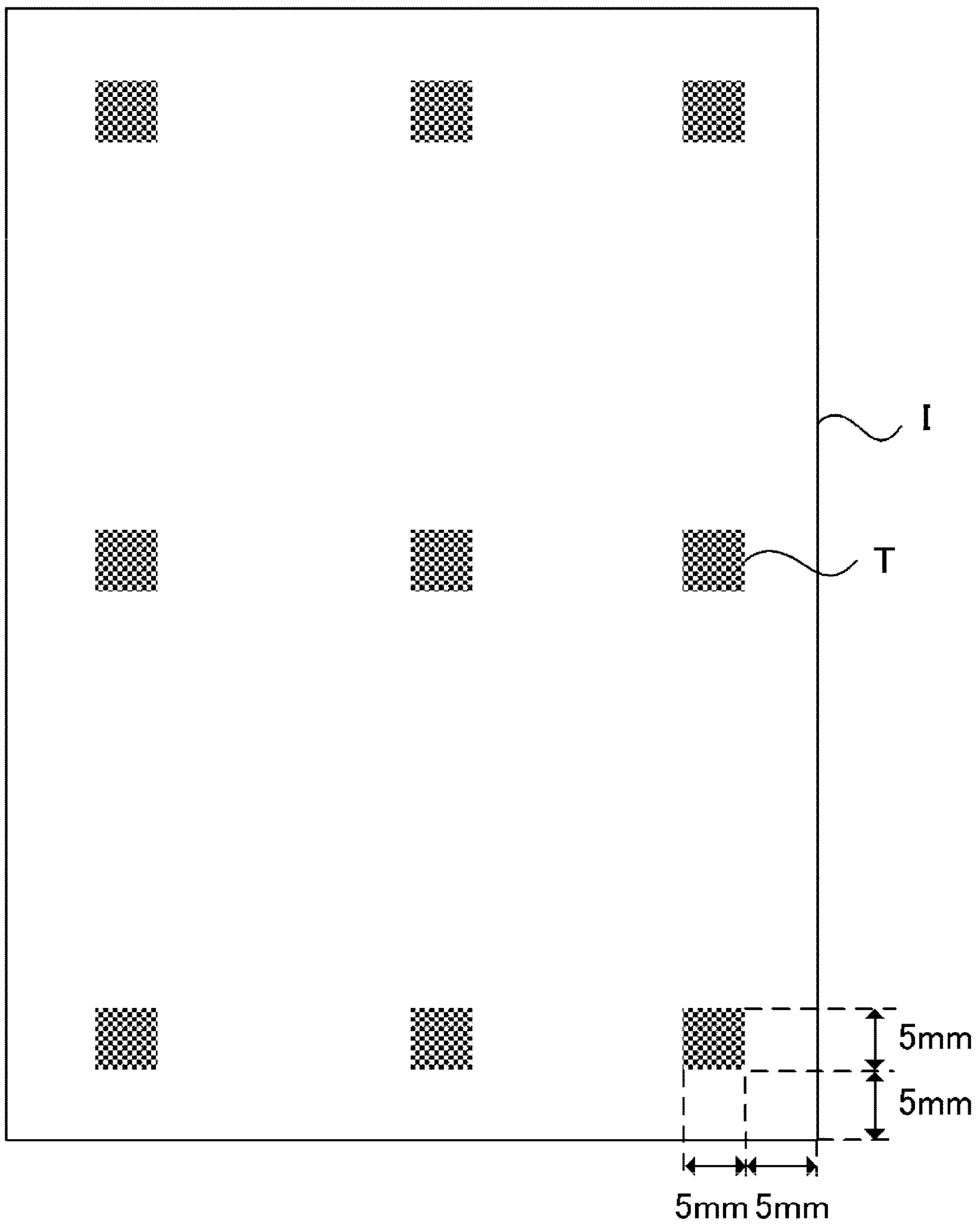
FIG. 8 is a diagram illustrating an image used for fixability evaluation of Test 1.

A fixability evaluation image used in the evaluation is illustrated in FIG. 8. The fixability evaluation image I includes patch images T of black toner monochrome, a printing rate of 50%, and a size of 5 mm×5 mm at a total of 9 places of three places along a width direction and three places along a conveyance direction of the recording material S. The patch images positioned at both ends in the width direction and the conveyance direction are positioned such that outer sides of the patch images are on 5 mm inner sides of ends of a recording material S.

In order to compare and verify effects of the present invention, three kinds of test apparatuses in which configurations of fixing devices F1 are different from each other were used. A test apparatus 1 is an image forming apparatus including a fixing device F1 according to Embodiment 1. A test apparatus 2 is a fixing device F1 and an image forming apparatus that are comparison targets in which openings 79 are uniformly disposed in a fixing frame 75 in the rotational axis direction of the fixing device F1. A test apparatus 3 is a fixing device F1 and an image forming apparatus that are comparison targets in which no opening 79 is not disposed in a fixing frame 75.

For a printed image, density measurement and a rubbing test were performed, and fixability was evaluated. An evaluation sequence will be described. First, a reflection density of measurement points inside one page was measured. In the density measurement, a reflection densitometer (eXact manufactured by Xrite Corp.) was used. After the density measurement, a rubbing test was performed by rubbing an image with lens-cleaning paper. As the rubbing method, on five sheets of lens-cleaning paper, a weight of a weight of 200 g and a base area of 5 cm 2 was loaded and was caused to reciprocate five times. A density after rubbing was measured, and a density reduction rate was calculated using the following equation.

Density reduction rate=(density before rubbing−density after rubbing)/density before rubbing A target value of fixability is equal to or smaller than a density reduction rate 20%.

In addition, the surface temperature of the roller part 214 of the pressing roller 21 during printing was measured. The surface temperature immediately before a 30th recording material S enters the nip NF was measured at three different places along the rotational axis direction. The measurement positions are positions corresponding to positions of the patch images T of the fixability evaluation image.

FIG. 9 represents measurement values of fixability evaluation results and surface temperatures of the pressing roller 21 in Test 1. In a table illustrated in FIG. 9, "Image left end" in the field of fixability is an average value of density reduction rates of patch images T of three points vertically aligned along a conveyance direction on the second shaft 211E side. "Image center" is an average value of density reduction rates of patch images T of three points vertically aligned along the conveyance direction at the center in the rotational axis direction. "Image right end" is an average value of density reduction rates of patch images T of three points vertically aligned along the conveyance direction on the first shaft 211D side. In addition, "Corresponding to image left end" of the field of the surface temperature of the pressing roller 21 is an average value of surface temperatures of the pressing roller 21 at a position corresponding to the position of the patch image T of "Image left end". "Corresponding to image center" is an average value of surface temperatures of the pressing roller 21 at a position corresponding to the position of the patch image T of "Image center". "Corresponding to image right end" is an average value of surface temperatures of the pressing roller 21 at a position corresponding to the position of the patch image T of "Image right end". In each thereof, the surface temperature of the pressing roller 21 is a temperature during a fixing operation for the 30th print.

In the test apparatus 1 as Embodiment 1, fixabilities of the image left end and the image right end were equal. The surface temperatures of the pressing roller 21 at an image left end corresponding part and an image right end corresponding part. In the test apparatus 2 as a comparative example in which openings 79 are uniformly disposed in the rotational axis direction, fixability of the image right end was low, and the target was not satisfied. In addition, a difference between fixabilities of the image left end (the second shaft 211E side) and the image right end (the first shaft 211D side) was large. When the image center is included, a fixability difference inside an image becomes 9%, and a large deviation occurred.

As a surface temperature of the pressing roller 21, the temperature of an image right end corresponding part (the first shaft 211D side) was low. Large heat escapes to the first shaft 211D of the pressing roller 21, heat radiation is uniformly generated in the rotational axis direction, and thus the temperature of the first shaft 211D side of the pressing roller 21 is considered to have dropped.

In the test apparatus 3 as a comparative example in which there is no opening 79, a difference between fixabilities of the image left end (the second shaft 211E side) and the image right end (the first shaft 211D side) was large. In addition, the fixability of the image right end was slightly low, and a margin of the fixability for the target was small. As the surface temperature of the pressing roller 21, the temperature of the image right end corresponding part (the first shaft 211D side) was slightly low.

The temperature detecting element 26 of the fixing device F1 is disposed near the center of the fixing device F1 in the rotational axis direction on the rear side of the heater 23, and power supply is controlled such that the heater 23 is maintained at a target temperature. Since the surface temperature of the pressing roller 21 is lower than the temperature of the heater 23 and the fixing film 22, and thus heat is transferred from the heater 23 to the pressing roller 21 through the fixing film 22 in accordance with a temperature difference between the heater 23 and the fixing film 22 and the surface of the pressing roller 21.

In the test apparatus 3, since no opening 79 is not provided, heat radiation from the pressing roller 21 is inhibited as a whole, and the surface temperature of the pressing roller 21 including the center part as a whole may easily rise. When the temperature of the center part of the pressing roller 21 becomes high, the amount of heat transferred from the center part of the heater 23 in the rotational axis direction to the pressing roller 21 becomes small. Since the temperature detecting element 26 is disposed at the center part in the rotational axis direction, in this case, power supply to the heater 23 is controlled to be small by a power control means. On the other hand, a large amount of heat is transferred to the first shaft 211D side of the pressing roller 21, and thus a result that the temperature of the first shaft 211D side does not sufficiently rise is acquired.

As above, in Embodiment 1, no opening is provided in the first region of the one-end side (the first shaft 211D side) with reference to the conveyance center position Ct in the rotational axis direction, and the opening 79 is provided in the second region of the other-end side (the second shaft 211E side). In accordance with this, there is a difference in the shape of the pressing roller 21 between both sides in the rotational axis direction having the conveyance center position Ct as its center, and even when there is a difference in the heat capacity of the pressing roller 21 between both sides in the rotational axis direction having the conveyance center position Ct as its center, the surface temperature of the pressing roller 21 can be configured to be uniform in the rotational axis direction. In accordance with this, the fixability can be configured to be uniform in the rotational axis direction.

In Embodiment 1, as illustrated in FIGS. 5 and 7, a configuration in which the openings 79 are disposed at a position on the side of the second shaft 211E of the fixing frame 75 facing the pressing roller 21 and a position near the center part, and no opening 79 is provided at the position of the side of the first shaft 211D is formed. It can be regarded that a total area of the opening 79 disposed in the first region corresponding to the first part of the pressing roller 21 is zero, and a total area of the opening 79 disposed in the second region corresponding to the second part of the pressing roller 21 is larger than a total area of the opening 79 disposed in the first region.

Modified Example

The configuration of the openings 79 is not limited to the example described above. For example, as below, openings 79 may be disposed in the first region of the one-end side (the first shaft 211D side) of the fixing frame 75 and the second region of the other-end side (the second shaft 211E side). In other words, in the rotational axis direction of the fixing device F1, a total area SL (a second value) of openings 79 disposed in the second region of the fixing frame 75 with reference to the conveyance center position Ct is larger than a total area SR (a first value) of openings 79 disposed in the first region. The total area SR of the openings 79 disposed in the first region is a total area of the openings 79 disposed near the first part of the pressing roller 21. In addition, the total area SL of the openings 79 disposed in the second region is a total area of the openings 79 disposed near the second part of the pressing roller 21.

In this way, as a method for configuring a total area of openings 79 to be different in accordance with a position in the rotational axis direction in regions in which the openings 79 are disposed, an arbitrary method may be used. For example, the shapes and the sizes of openings 79 may be configured to be different in the rotational axis direction, and in a case in which the openings 79 are disposed at a plurality of places, the numbers of openings 79 may be configured to be different in the rotational axis direction.

Figure 10:
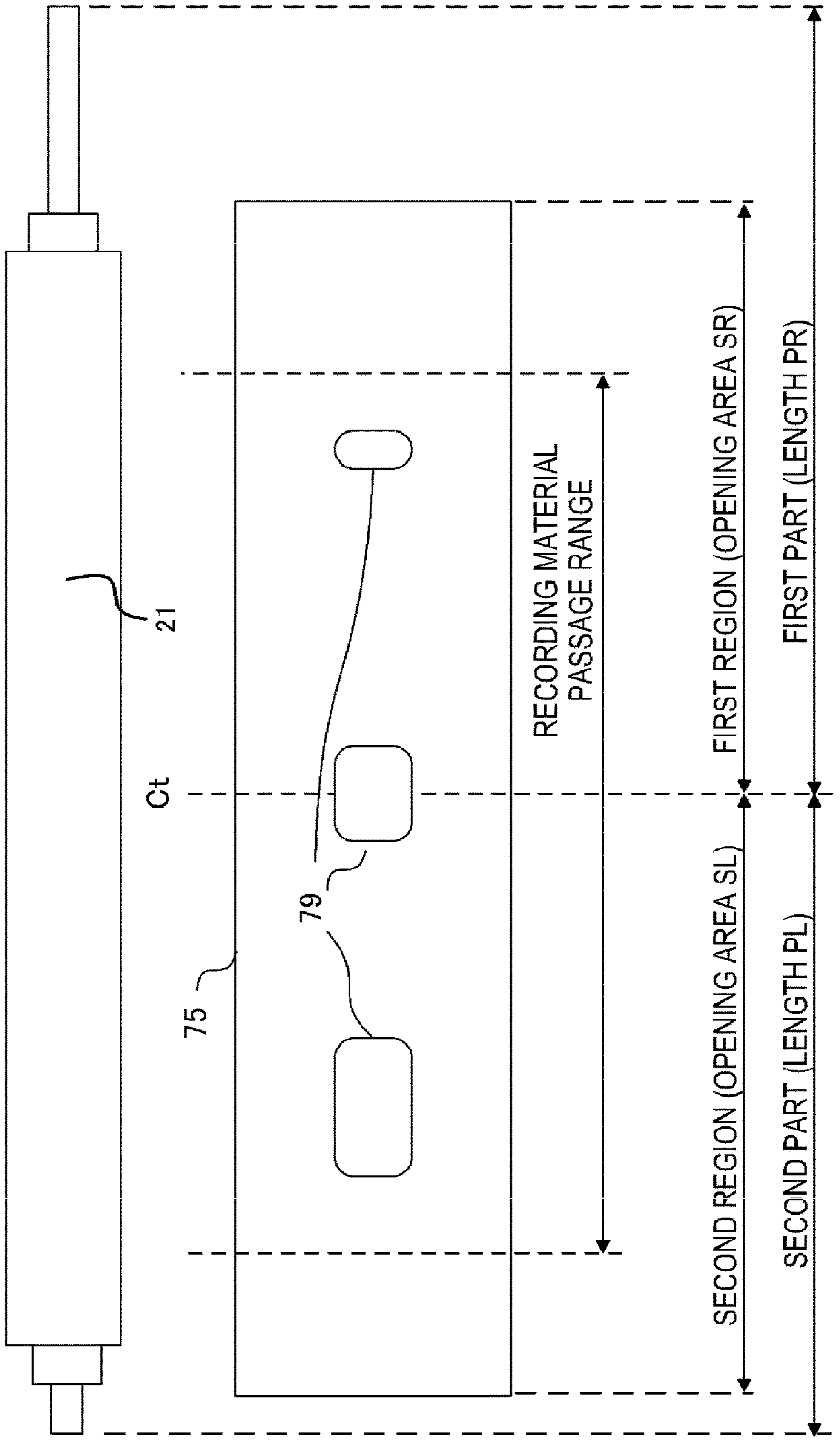
FIG. 10 is a diagram illustrating a modified example of Embodiment 1.

For example, as illustrated in a modified example of Embodiment 1 illustrated in FIG. 10, by disposing openings 79 at a position of a side of the second shaft 211E, a position near the center part, and a position on a side of the first shaft 211D, sizes of the openings 79 may be different in accordance with the positions. In other words, the size of openings 79 disposed in the second region corresponding to the second part of the pressing roller 21 may be configured to be larger than the size of openings 79 disposed in the first region corresponding to the first part. In accordance with this, the total area SL of openings 79 disposed in the second region corresponding to the second part of the pressing roller 21 becomes larger than the total area SR of openings 79 disposed in the first region corresponding to the first part of the pressing roller 21. In addition, as illustrated in the modified example of Embodiment 1 illustrated in FIG. 11, by disposing openings 79 at a position of a side of the second shaft 211E, a position near the center part, a position of a side of the first shaft 211D, the numbers of openings 79 may be configured to be different in accordance with positions in the rotational axis direction. In other words, the number of openings 79 disposed in the second region corresponding to the second part of the pressing roller 21 may be configured to be larger than the number of openings 79 disposed in the first region corresponding to the first part. In accordance with this, a total area SL of openings 79 disposed in the second region corresponding to the second part of the pressing roller 21 becomes larger than a total area SR of openings 79 disposed in the first region corresponding to the first part of the pressing roller 21.

Here, in accordance with a degree in which the length PR of the first part of the pressing roller 21 is longer than the length PL of the second part or more, the total area SL of the second part may become further longer than the total area SR of the first part. In other words, an area ratio between openings 79 of the first region and the second region may be equal to or higher than a length ratio between the second part and the first part of the pressing roller 21. A ratio between the total area SR of openings 79 disposed in the first region and the total area SL of openings 79 disposed in the second region may satisfy the following Equation 1 with respect to the ratio between the length PR of the first part of the pressing roller 21 in the rotational axis direction and the length PL of the second part in the rotational axis direction.

$$SL/SR \geq PR/PL \quad \text{Equation 1}$$

Figure 11:
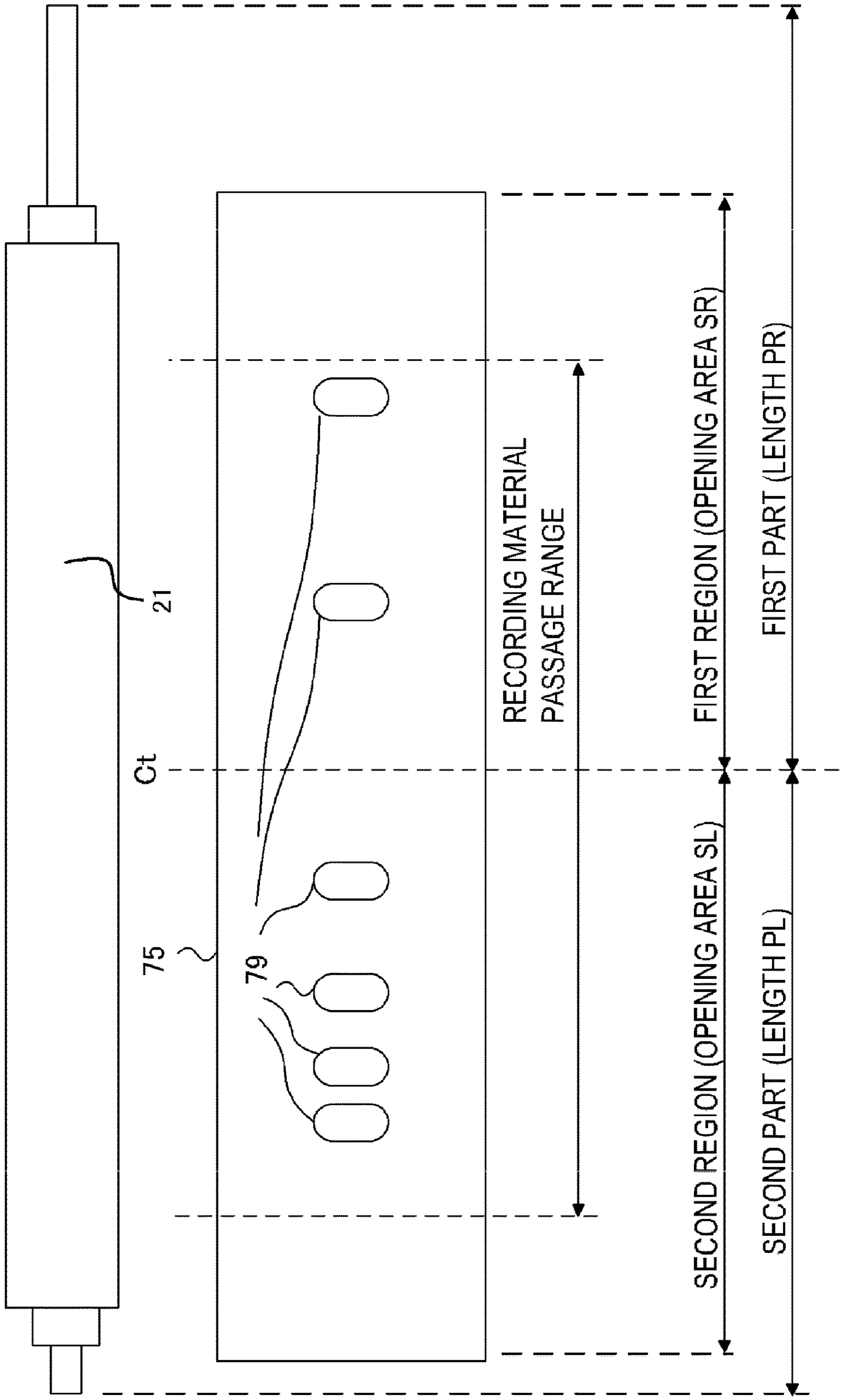
FIG. 11 is a diagram illustrating a modified example of Embodiment 1.

In this way, in the configurations of FIGS. 10 and 11, a total area SR of openings 79 disposed in the first region corresponding to the first part of the pressing roller 21 is smaller than a total area SL of openings 79 disposed in the second region corresponding to the second part of the pressing roller 21. In accordance with this, even when there is a difference in the shape of the pressing roller 21 between both sides in the rotational axis direction having the conveyance center position Ct as its center, and there is a difference in the heat capacity of the pressing roller 21 between both sides in the rotational axis direction having the conveyance center position Ct as its center, the surface temperature of the pressing roller 21 can be configured to be uniform in the rotational axis direction. In accordance with this, the fixability can be configured to be uniform in the rotational axis direction. When the surface temperature of the pressing roller 21 rises during a fixing operation and preparation of the fixing operation, heat radiation from the surface of the pressing roller 21 to near air occurs. The heat radiated to a place near the pressing roller 21 is discharged from the opening 79 to the double-side conveyance path 81 through heat transfer to the air and convection and is discharged to the outside of the image forming apparatus P.

Through the opening 79 disposed in the fixing frame 75 facing the surface of the pressing roller 21, heat radiation from the surface of the pressing roller 21 occurs. The larger the area of the opening 79 disposed in the fixing frame 75 facing the surface of the pressing roller 21, the larger the heat radiation from the surface of the pressing roller 21 becomes. In Embodiment 1, since the area of the opening 79 of the second region is larger than the area of the opening 79 of the first region, heat generation from the second part of the pressing roller 21 corresponding to the second region is larger than heat generation from the first part of the pressing roller 21 corresponding to the first region.

In accordance with this, heat generation from the surface of the pressing roller 21 can be performed in a direction offsetting a deviation in the temperature according to heat transfer of the inside of the pressing roller 21. Thus, occurrence of a temperature difference in the rotational axis direction in the pressing roller 21 due to a difference between lengths of both-side parts of the conveyance center position Ct of the core 211 of the pressing roller 21 in the rotational axis direction is inhibited, and occurrence of a deviation in the fixability of the fixing device F1 in the rotational axis direction can be inhibited. Thus, effects similar to those of Embodiment 1 described above can be acquired.

In addition, the opening 79 may be disposed in an inner part of a range D1 in which the roller part 214 of the pressing roller 21 is present in the rotational axis direction of the fixing device F1 in the fixing frame 75 configuring a housing member housing the pressing roller 21. Here, the range D1 in which the roller part 214 is present is a range corresponding to a part of the pressing roller 21 that is in contact with a recording material S. In other words, the range is a range interposed between a virtual face perpendicular to the rotational axis direction including an end face 215R of the one-end side of the roller part 214 in the rotational axis direction and a virtual face perpendicular to the rotational axis direction including an end face 215L of the other-end side. Alternatively, the opening 79 within the range in which the roller part 214 of the pressing roller 21 may be present satisfy Equation 1.

The opening 79 may be disposed in an inner part of a range D2 through which a recording material S passes in the rotational axis direction of the fixing device F1 in the fixing frame 75 configuring a housing member housing the pressing roller 21. Here, the range D2 through which a recording material S passes is a passing range of a recording material S of a maximum width that can be used by the image forming apparatus P in the rotational axis direction in the fixing frame 75. In other words, the range D2 through which a recording material S passes is a range interposed between a virtual face perpendicular to the rotational axis direction including an end of the one-end side of the recording material S in the rotational axis direction at the time of passing though the fixing device F1 and a virtual face perpendicular to the rotational axis direction including an end of the other-end side. Alternatively, the opening 79 within the range D2 of the fixing device F1 through which the recording material S passes may satisfy Equation 1.

In addition, the opening 79 may be present in a region of the fixing frame 75 within a range of the pressing roller 21 facing the roller part 214 in the rotational axis direction of the fixing device F1. Alternatively, the opening 79 present in a region of the fixing frame 75 within the range of the pressing roller 21 facing the roller part 214 may satisfy Equation 1. The reason for this is that, in the pressing roller 21, the roller part 214 has the highest temperature and has a high effect of heat radiation.

The opening 79 may be present in the region of the fixing frame 75 within the range through which a recording material S passes in the rotational axis direction of the fixing device F1. Alternatively, the opening 79 present in the region of the fixing frame 75 within the range of the fixing device F1 through which the recording material S passes may satisfy Equation 1. The reason for this is that a temperature difference between parts contributing to fixability is directly improved through heat radiation, and an improvement effect is strong.

Embodiment 2

In an image forming apparatus according to Embodiment 2, a shape of a core 211 of a pressing roller 21 is different from that according to Embodiment 1. For the other components similar to those according to Embodiment 1, the same reference signs and names as those according to Embodiment 1 will be used, and thus description thereof will be omitted.

Figure 12:
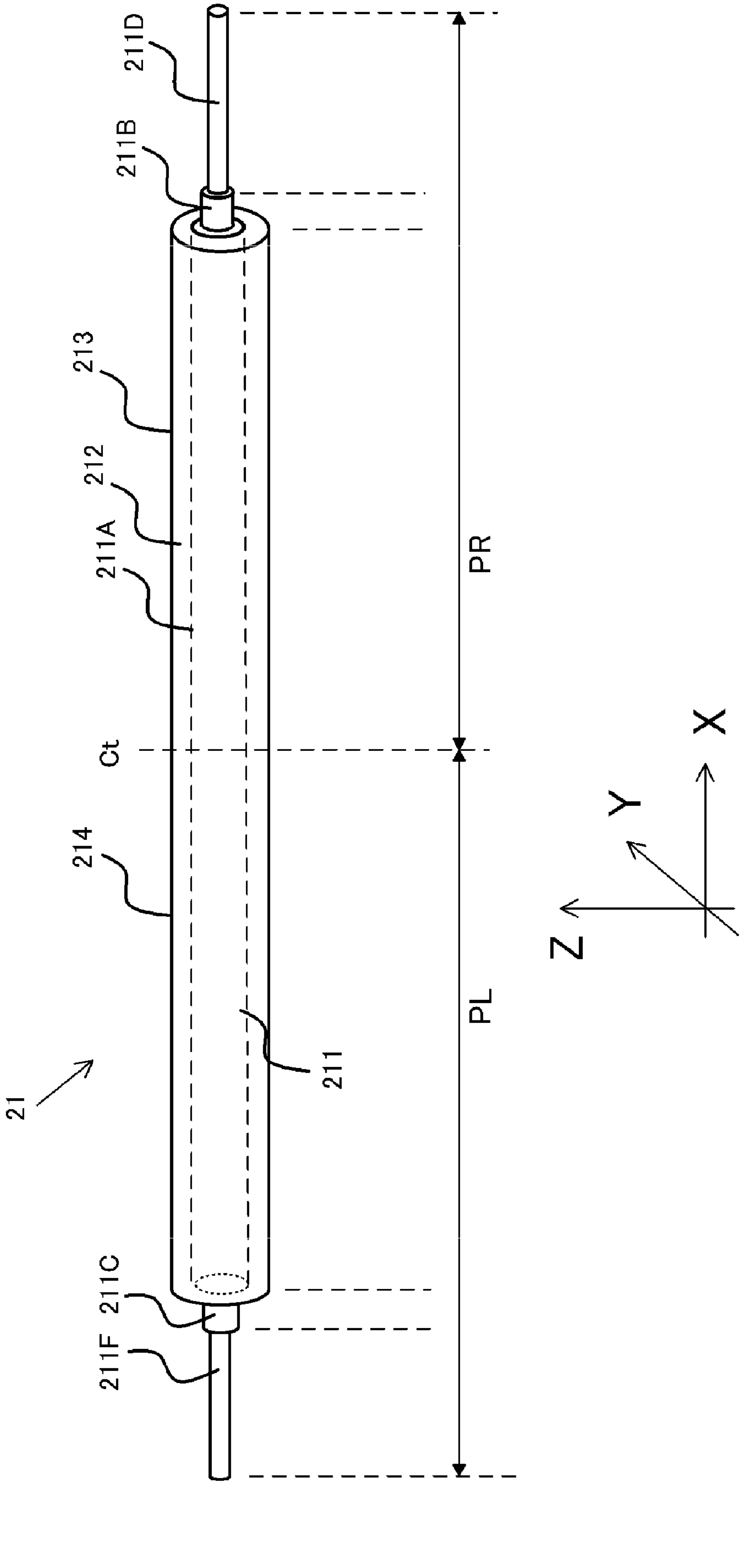
FIG. 12 is a diagram illustrating a schematic configuration of a pressing roller according to Embodiment 2.

FIG. 12 is a diagram schematically illustrating a shape of the pressing roller 21 of the image forming apparatus according to Embodiment 2 in the rotational axis direction. The pressing roller 21 according to Embodiment 2 is slidably brought into contact with a bearing 72 (see FIG. 5), and a length of a first shaft 211D in which a pressing roller driving gear 84 (see FIG. 5) is mounted and a length of a second shaft 211F that is slidably brought into contact with the bearing 72 in the rotational axis direction are the same. Thus, when the pressing roller 21 is considered with being divided into a first part of the first shaft 211D side and a second part of the second shaft 211E side having a conveyance center position Ct as its center, a length PR of the first part in the rotational axis direction and a length PL of the second part in the rotational axis direction are the same.

Figure 13:
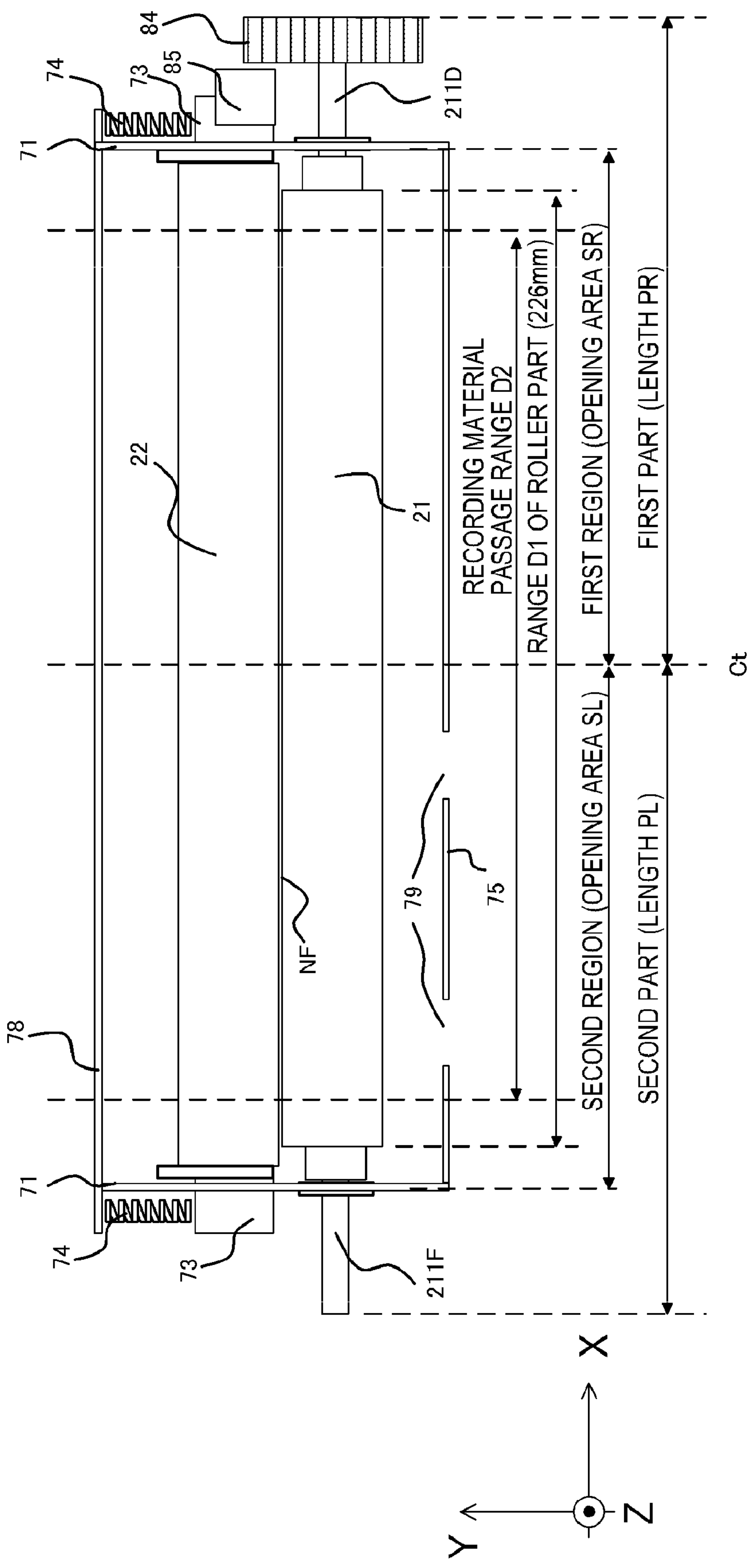
FIG. 13 is a diagram illustrating a schematic configuration of a fixing device according to Embodiment 2 in the rotational axis direction.

FIG. 13 is a diagram schematically illustrating the configuration of a fixing device F1 in the rotational axis direction in the image forming apparatus according to Embodiment 2. Similar to Embodiment 1, the pressing roller driving gear 84 for driving the pressing roller 21 is mounted at a tip end of the first shaft 211D and is driven by an external driving member (not illustrated) of the fixing device F1. In other words, in the first part of the one-end side and the second part of the other-end side of the pressing roller 21, the pressing roller driving gear 84 as a driving member that is a member other than constituent components of the pressing roller 21 is disposed only at an end of the first part in the rotational axis direction. In accordance with this, the heat capacity of the first part of the pressing roller 21 is larger than the heat capacity of the second part. Thus, the pressing roller 21 has thermal characteristics in which the first part can radiate heat more easily than the second part.

In the pressing roller 21 according to Embodiment 2, although lengths of the first shaft 211D and the second shaft 211F in the rotational axis direction are the same, heat of the pressing roller 21 easily runs away through the pressing roller driving gear 84, and thus the temperature of the first shaft 211D side may easily fall. Also in a case in which the lengths of the first shaft 211D and the second shaft 211F are the same, although there is a difference to some degrees from a case in which, similar to Embodiment 1, the lengths of the first shaft 211D and the second shaft 211E are different from each other, a deviation in the temperature occurs in the pressing roller 21 in the rotational axis direction due to presence/absence of the pressing roller driving gear 84.

For this reason, also in Embodiment 2, similar to Embodiment 1, no opening is provided in a first region (a region of the first shaft 211D side) corresponding to the one-end side with respect to the center of the fixing frame 75, and openings are disposed in a second region (a region of the second shaft 211F side) corresponding to the other end. In accordance with this, a deviation of the temperature in the rotational axis direction of the pressing roller 21 can be inhibited. In addition, similar to the modified example of Embodiment 1, by disposing openings 79 in the fixing frame 75 facing the pressing roller 21, a total area of the openings 79 may be configured to be different between the first region and the second region. In other words, in the rotational axis direction, a total area SL of openings 79 disposed in the second region of the second shaft 211F side with reference to the conveyance center position Ct is larger than a total area SR of openings 79 disposed in the first region of the first shaft 211D side of the fixing frame 75.

Also in Embodiment 2, in order to offset a deviation of the form of heat transfer in the rotational axis direction inside the pressing roller 21, a difference in the opening area of the opening 79 in the rotational axis direction is provided. In accordance with this, the temperature of the pressing roller 21 is configured to be uniform in the rotational axis direction, and occurrence of a deviation in the fixability in the rotational axis direction can be inhibited.

In addition, in Embodiment 2, although an example in which, among the first part and the second part of the pressing roller 21, the pressing roller driving gear 84 that is a member different from the pressing roller 21 is disposed only at the end of the first part has been described, separate members may be disposed in both the first part and the second part. In a case in which the heat capacity of a separate member disposed at an end of the first part in the rotational axis direction is larger than the heat capacity of a separate member disposed at an end of the second part in the rotational axis direction, by disposing openings 79 having the configuration similar to that according to Embodiment 2 described above, occurrence of a deviation in the fixability in the rotational axis direction can be inhibited.

Embodiment 3

In an image forming apparatus according to Embodiment 3, an opening 83 is disposed in a side face facing a fixing film 22 of a sheet discharge upper guide 76 that is a guide member guiding a recording material S carried out from a recording material discharging port Fout of a fixing device F1 to a sheet discharge tray 15, which is different from Embodiment 1. The same reference signs and the same names as those according to Embodiment 1 will be used for other same components as those according to Embodiment 1, and description thereof will be omitted.

Figure 14:
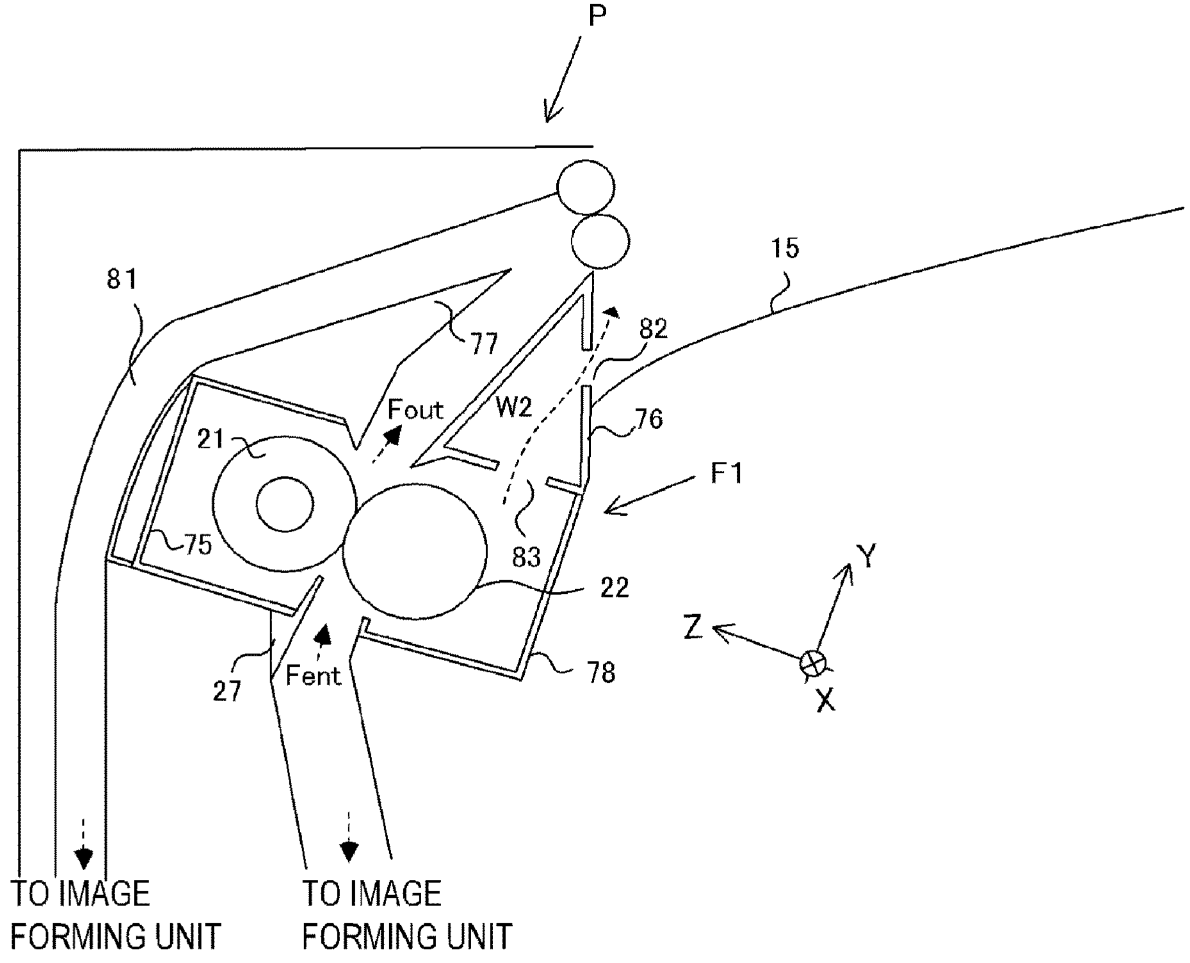
FIG. 14 is a diagram illustrating a cross-section configuration of the periphery of a fixing device according to Embodiment 3.

FIG. 14 is a schematic cross-sectional view according to a cross-section perpendicular to the rotational axis direction (direction X) of a pressing roller 21 for describing a peripheral part of the fixing device F1 according to Embodiment 3. In Embodiment 3, in the fixing device F1, an opening 83 different from a recording material entrance port Fent that is an entrance of a recording material S passing through the fixing device F1 and a recording material discharge port Fout that is an exit are disposed. The opening 83 communicates with an internal space of the sheet discharge upper guide 76, and the internal space of the sheet discharge upper guide 76 communicates with the outside of the image forming apparatus P in the sheet discharge tray 15 through an opening 82. A space near a fixing film 22 that is surrounded by the fixing film 22 and members disposed on the periphery of the fixing film 22 communicates with the outside of the image forming apparatus P through the opening 83, the sheet discharge upper guide 76 and the opening 82. The internal space of the sheet discharge upper guide 76 and the opening 82 function as a communication passage that causes a space near the pressing roller 21 connected to the opening 83 to communicate with the outside of the image forming apparatus P.

In other words, the opening 83 communicating with the outside of the image forming apparatus P near the sheet discharge tray 15 from the space surrounded by the fixing film 22, a fixing upper cover 78, and the sheet discharge upper guide 76 is disposed at a position facing the fixing film 22 from an upper side in the sheet discharge upper guide 76. In the sheet discharge upper guide 76, the opening 82 that is open at a position near the sheet discharge tray 15 is disposed, a passage that causes the opening 83 and the opening 82 to communicate with each other is formed inside, and a route W2 is formed by the openings 82 and 83 and this passage.

Figure 15:
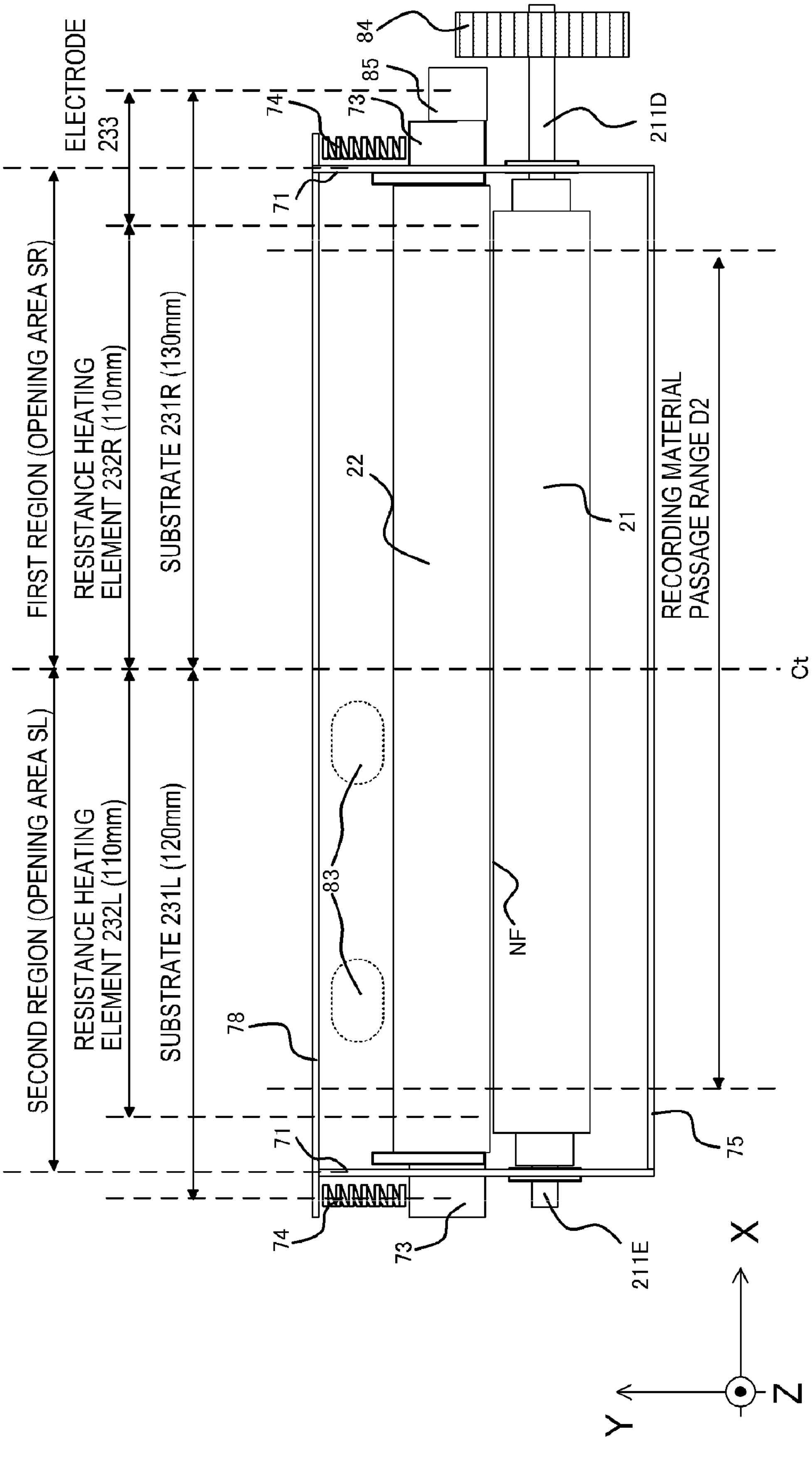
FIG. 15 is a diagram illustrating a schematic configuration of a fixing device according to Embodiment 3 in the rotational axis direction.

FIG. 15 is a schematic diagram illustrating a positional relation of the opening 83 and each member of the fixing device F1 according to Embodiment 3 in the rotational axis direction (the direction X). Among side faces configuring the sheet discharge upper guide 76, a side face in which the opening 83 is formed (a side face facing the fixing film 22) will be considered by dividing it into two regions including a first region of a power feed electrode 233 side of a heater 23 and a second region of a side opposite to the power feed electrode 233 with reference to a conveyance center position Ct. Here, no opening is formed in the first region, and the opening 83 is formed in the second region. Alternatively, a total area SL of the opening 79 formed in the second region may be configured to be larger than a total area SR of the opening 83 disposed in the first region.

The configurations of the heater 23 and a substrate 231 are similar to those according to Embodiment 1, and, as illustrated in FIG. 3, in the rotational axis direction, only in a first part 231R present on one side with respect to the conveyance center position Ct, the power feed electrode 233 that is an electrode part for supplying electric power to a resistance heating element 232 is included. In accordance with this, in the substrate 231, a first part 231R of the power feed electrode 233 side is longer than a second part 231L of the opposite side. Thus, in the substrate 231, there is a difference in the heat capacity between both sides of the conveyance center position Ct in the rotational axis direction. Thus, the substrate 231 has a thermal characteristic in which the first part 231R is easier in heat radiation than the second part 231L. As the temperature of the substrate 231, the temperature of the first part 231R of the power feed electrode 233 side may be easily caused to be lower than that of the second part 231L of the opposite side. In addition, the heater 23 is connected to a power feed connector 85 in the power feed electrode 233 and is connected to an external power supply of a fixing device F1 through the power feed connector 85. Since heat runs away through the power feed connector 85, also in this point, the temperature of the first part 231R of the power feed electrode 233 side may easily fall.

In Embodiment 3, a difference is provided in the rotational axis direction in an opening area of the opening 83 disposed near the fixing film 22 such that a deviation in the rotational axis direction in the form of heat transfer in the substrate 231 of the heater 23 is offset. In accordance with this, the temperature of the heater 23 is configured to be uniform in the rotational axis direction, and occurrence of a deviation in the fixability in the rotational axis direction can be inhibited.

In each of the embodiments described above, although an example in which the present invention is applied to a case in which the pressing roller 21 and the heater 23 configuring the fixing device F1 have asymmetric thermal characteristics on both sides of the conveyance center position Ct in the rotational axis direction has been described, the present invention is not limited to such embodiments. The present invention can be applied to a case in which the fixing device F1 has an asymmetric member having asymmetric thermal characteristics on both sides of the conveyance center position Ct in the rotational axis direction. Also in this case, an opening is disposed at a position near the asymmetric member in the fixing device F1, and a heat radiation path communicating with the outside of the image forming apparatus is connected to this opening. Then, in the asymmetric member, an area of the opening near a side having a small heat capacity may be configured to be larger than an area of the opening near a side having a large heat capacity, or an opening may be formed only near a side having a small heat capacity. In each of the embodiments described above, although a case in which the pressing roller 21 and the heater 23 are asymmetric members has been described as an example, other members such as the fixing film 22 and the like may be asymmetric members. Sizes of various members illustrated in each of the embodiments described above are examples, and an embodiment of the present invention is not limited to such sizes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-156018, filed on Sep. 29, 2022, which is hereby incorporated by reference herein in its entirety.

What is claimed is:

1. An image forming apparatus comprising:

a first rotation body;

a heater disposed in an internal space of the first rotation body;

a second rotation body including a rotation shaft, configured to come in contact with an outer peripheral surface of the first rotation body and to form a nip together with the first rotation body; and a frame body supporting the first rotation body and the second rotation body, wherein the image forming apparatus is configured to fix an image formed on a recording material passing through the nip, in a rotational axis direction of the second rotation body that is orthogonal to a conveyance direction of the recording material, the rotation shaft is exposed from a one-end side and an other-end side of the second rotation body, a length of the rotation shaft exposed on the one-end side is a first length, a length of the rotation shaft exposed on the other-end side is a second length smaller than the first length, and SL/SR≥PR/PL is satisfied, where PR is a length, in the rotational axis direction, of a the one-end side part of the second rotation body with respect to the center of the frame body, PL is a length, in the rotational axis direction, of a the other-end side part of the second rotation body with respect to the center of the frame body, SR is a total area of openings disposed in a first region, SL is a total area of openings disposed in a second region, the first region is a region corresponding to the one-end side of the frame body with respect to the center of the frame body in the rotational axis direction, and the second region is a region corresponding to the other-end side of the frame body with respect to the center of the frame body in the rotational axis direction.

2. The image forming apparatus according to claim 1, wherein the number of the openings disposed in the second region is larger than the number of the openings disposed in the first region.

3. The image forming apparatus according to claim 1, wherein the openings are openings other than an entrance and an exit for the recording material disposed in the frame body.

4. The image forming apparatus according to claim 1, wherein a communication passage communicating with the outside of the image forming apparatus is connected to the openings.

5. The image forming apparatus according to claim 4, wherein the communication passage is a double-side conveyance path in which the recording material is conveyed in a case in which image formation is performed for both sides of the recording material.

6. The image forming apparatus according to claim 4, further comprising a guide member configured to guide the recording material carried out from an exit for the recording material disposed in the frame body to a sheet discharge tray, wherein the communication passage passes through the inside of the guide member and communicates with the sheet discharge tray.

7. The image forming apparatus according to claim 1, wherein the openings are disposed at a part of the frame body within a passage range of the recording material with a maximum width that is usable in the image forming apparatus in the rotational axis direction.

8. The image forming apparatus according to claim 1, wherein the first rotation body is a film having a cylinder shape, the second rotation body is a roller, the film is pinched by the heater and the roller, and an image on the recording material is heated through the film in the nip formed between the film and the roller.

9. The image forming apparatus according to claim 8, wherein the openings are disposed within a range of the frame body corresponding to a part of the roller that comes in contact with the recording material in the rotational axis direction.

10. The image forming apparatus according to claim 1, wherein the frame body houses the second rotation body.

11. The image forming apparatus according to claim 1, wherein the second rotation body is disposed in a space surrounded by the frame body.

12. The image forming apparatus according to claim 1, wherein the second rotation body includes a roller part having an elastic layer, and the rotation shaft for supporting the roller part, the rotation shaft is exposed from the roller part.

13. The image forming apparatus according to claim 1, wherein the rotation shaft includes stepped parts of which an outer diameter changes.

14. The image forming apparatus according to claim 1, wherein a driving gear that drives the second rotation body is mounted at the rotation shaft exposed on the one-end side.

15. The image forming apparatus according to claim 1, wherein the center part of the frame body is located at a conveyance center position of the recording material in the rotational axis direction.

16. The image forming apparatus according to claim 1, wherein the first region and the second region are located in a face facing the second rotation body.

17. The image forming apparatus according to claim 1, wherein the shape of the second rotation body is asymmetric with respect to a conveyance center position of the recording material.

18. The image forming apparatus according to claim 1, wherein the heater includes a substrate, and a resistance heating element disposed on the substrate along the rotational axis direction, the resistance heating element is disposed to be symmetrical with respect to a conveyance center position of the recording material.

19. The image forming apparatus according to claim 1, wherein the shape of the opening is a round hole or a slit.

* * * * *